(12) United States Patent
Namba

(10) Patent No.: US 7,226,383 B2
(45) Date of Patent: Jun. 5, 2007

(54) CONTROL DEVICE FOR HYBRID VEHICLE

(75) Inventor: Atsushi Namba, Tokyo (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 261 days.

(21) Appl. No.: 10/968,099

(22) Filed: Oct. 20, 2004

(65) Prior Publication Data

US 2005/0090366 A1    Apr. 28, 2005

(30) Foreign Application Priority Data

Oct. 22, 2003    (JP) .............................. 2003-361417

(51) Int. Cl.
 *B60W 10/08* (2006.01)
(52) U.S. Cl. ................ 477/5; 477/14; 477/174; 477/175; 477/179; 477/180; 477/181
(58) Field of Classification Search ............. 477/5, 477/6, 7, 8, 14, 169, 174, 175, 179, 180, 477/181
See application file for complete search history.

(56) References Cited

U.S. PATENT DOCUMENTS

| RE36,678 E * | 5/2000 | Moroto et al. ............ 180/65.4 |
| 6,523,436 B2 | 2/2003 | Minowa et al. |
| 6,543,561 B1 | 4/2003 | Pels et al. |
| 6,612,963 B2 | 9/2003 | Minowa et al. |
| 6,692,405 B2 * | 2/2004 | Minowa et al. ................. 477/5 |
| 6,722,230 B2 * | 4/2004 | Sakamoto et al. ............ 74/661 |
| 6,976,934 B2 * | 12/2005 | Komeda et al. ............... 477/5 |
| 6,991,054 B2 * | 1/2006 | Takaoka et al. ........... 180/65.2 |
| 2001/0011050 A1 * | 8/2001 | Yamaguchi et al. ........... 477/3 |
| 2002/0049115 A1 * | 4/2002 | Suzuki .......................... 477/3 |
| 2004/0251065 A1 * | 12/2004 | Komiyama et al. ........ 180/65.4 |

FOREIGN PATENT DOCUMENTS

| DE | 102 04 981 A1 | 6/2002 |
| JP | 2000289472 | 10/2000 |

* cited by examiner

*Primary Examiner*—David D. Le
(74) *Attorney, Agent, or Firm*—Smith, Gambrell & Russell, LLP

(57) ABSTRACT

A hybrid vehicle is driven by one or both of an engine and a drive motor. The engine is started by a power generating motor, and power generated by the engine is supplied to a battery. An engine-power transmission path is provided with a coupling for being shifted to a connection state of transmitting engine power to drive wheels and a disconnection state of cutting off the transmission. In connecting the coupling while the drive motor is driven and transmitting engine torque, a revolution speed of the power generating motor is controlled based on that of the drive motor. After a revolution speed of an input-side shaft of the coupling is synchronized with that of an output-side shaft, the coupling is connected. After the coupling is connected, torque of the drive motor and engine is controlled based on required torque of the vehicle.

24 Claims, 16 Drawing Sheets

CONTROL DEVICE FOR HYBRID VEHICLE

BACKGROUND OF THE INVENTION

The present invention relates to a control device for a hybrid vehicle that uses an engine and a drive motor together as a source of power.

A hybrid vehicle, which uses an internal combustion engine such as a gasoline engine and an electric motor together as a source of power of the vehicle, includes a series and parallel type. This type of hybrid vehicle is provided with a power generator in addition to the engine and the drive motor, and driving of the vehicle is shifted to any one of driving by the engine, driving by the drive motor, and driving by both of the engine and the motor depending on a running state, whereby the power generator can be driven by the engine at a time of running by the drive motor. The hybrid vehicle can be changed to a motor drive mode of driving the vehicle only by the drive motor, and an engine drive mode of driving the vehicle by the engine or by the drive motor as well as the engine. For example, the vehicle can be driven by the drive motor at a starting time when driving torque is required, and the vehicle can be driven by the engine when a vehicle speed is increased, and the vehicle can be driven by the drive motor and the engine at a high-load running time such as a uphill running time (see Japanese Patent Laid-open No. 2000-289472). The running in which the vehicle is driven by both of the engine and the drive motor under the engine drive mode is also called as a parallel running type.

SUMMARY OF THE INVENTION

This type of hybrid vehicle is shifted in many cases from the running only by the motor to the running by both of the motor and the engine, and the motor driving is performed until a remaining capacity (SOC) of a battery becomes small. As background of this, the vehicle is motor-driven when high torque and a low speed are required at, for example, a starting time or the like. During normal running, for example, if the vehicle has a speed of 30 km/h or more, it is shifted to the parallel running by both of the engine and the motor. Since an engine speed is largely changed depending on a load and a vehicle speed etc. under the parallel running, it is desirable to make an operation range in which the parallel running is performed as small as possible, in order to operate the engine in an efficient range as long as possible.

This type of hybrid vehicle has a motor-power transmission path for transmitting motor torque to drive wheels, and an engine-power transmission path for transmitting engine torque to the drive wheels. The engine-power transmission path is provided with a clutch, i.e., an engagement apparatus for changing the path to a power-transmission state and a cut-off state. Therefore, when the running is shifted from the motor drive mode to the engine drive mode, the engine torque is transmitted to the drive wheels by connecting a clutch.

In the case where a multiple wet clutch is employed as the clutch provided in the engine-power transmission path, a clutch disc is engaged while slipping, so that it is possible to reduce a change shock caused by such a change. However, since it is necessary to perform engaging and disengaging operations of the multiple wet clutch by a hydraulic plunger, a hydraulic pump requires being mounted on the vehicle. However, in the hybrid vehicle, it is preferable that the hydraulic pump is not mounted. If a mechanical clutch, i.e., a coupling that works based on an electric signal is used to connect and disconnect it and the engine-power transmission path, the change shock is increased, so that there is the problem that a smooth change can not be performed. In particular, if the driving only by the motor and the driving by the engine are shifted from one to the other under a state in which the vehicle speed is comparatively high, the shift is performed in a region in which rotation of the drive motor is high. Accordingly, in order to eliminate a rotation difference between an input side and an output side of the coupling, it is necessary to make one side of the coupling coincide with the other side.

An object of the present invention is to prevent occurrence of a change shock caused in shifting the vehicle from a motor driving state to an engine driving state.

Another object of the present invention is to prevent a change shock caused in shifting the vehicle from an engine driving state to a motor driving state.

A control device for a hybrid vehicle according to the present invention comprises: an engine driving drive wheels via an engine-power transmission path; a drive motor driving said drive wheels via a motor-power transmission path; a power generating motor provided to said engine-power transmission path, starting said engine, and generating power by said engine; and a coupling provided to said engine-power transmission path and shifted to a connection state of transmitting engine power to said drive wheels and a disconnection state of cutting off the transmission, wherein a revolution speed of said power generating motor is controlled based on a revolution speed of said drive motor when said coupling is connected to transmit torque of said engine to said drive wheels under a state in which the power is transmitted to said drive wheels from said drive motor, said coupling is connected after a revolution speed of an input-side shaft of said coupling and a revolution speed of an output-side shaft thereof are synchronized, and said drive motor and the torque of said engine are controlled in accordance with required torque of the vehicle after said coupling is connected.

The control device for a hybrid vehicle according to the present invention further comprises: in connecting said coupling, a synchronization phase for synchronizing the revolution speed of said input-side shaft with the revolution speed of said output-side shaft; a synchronization determining phase for determining whether the synchronization is established; a connection phase for executing a connecting operation of said coupling; and a connection-side-torque cooperation phase for changing engine torque and motor torque after the connection is completed, wherein each of said phases is transited in accordance with an elapsed time or the revolution speed of the power generating motor.

In the control device for a hybrid vehicle according to the present invention, at a time of connecting said coupling, a target revolution speed of said power generating motor is controlled by a function of time based on a revolution speed at a time of starting the control.

In the control device for a hybrid vehicle according to the present invention, at a time of connecting said coupling, completion of the connection is determined when a state in which an error between the revolution speed and a target revolution speed of said power generating motor is within a predetermined range continues for a predetermined time.

In the control device for a hybrid vehicle according to the present invention, after said coupling is connected, engine torque is increased and motor torque is decreased.

In the control device for a hybrid vehicle according to the present invention, said power generating motor is controlled in revolution speed until the connection of said coupling is completed, and said power generating motor is controlled in zero torque after the connection is completed.

A control device for a hybrid vehicle according to the presents invention comprises: an engine driving drive wheels via an engine-power transmission path; a drive motor driving said drive wheels via a motor-power transmission path; a power generating motor provided to said engine-power transmission path, starting said engine, and generating power by said engine; and a coupling provided to said engine-power transmission path and shifted to a connection state of transmitting engine power to said drive wheels and a disconnection state of cutting off the transmission, wherein, in disconnecting said coupling under a state in which the power is transmitted to said drive wheels from said engine and cutting off transmission of said engine torque to said drive wheels, torque of said drive motor and said engine is controlled in accordance with required torque of the vehicle and thereafter said coupling is disconnected, and after the disconnection of said coupling is completed, a revolution speed of said power generating motor is controlled in accordance with a revolution speed of said drive motor so that said input-side shaft and said output-side shaft differ from each other in a revolution speed.

The control device for a hybrid vehicle according to the present invention further comprises: in disconnecting said coupling, a disconnection-side-torque cooperation phase for reducing the engine torque; a disconnection phase for disconnecting said coupling; and a synchronization finishing phase for making said input-side shaft and said output-side shaft differ from each other in a revolution speed, wherein, each of said phases is transited in accordance with an elapsed time or the revolution speed of said power generating motor.

In the control device for a hybrid vehicle according to the present invention, the revolution speed of said power generating motor after disconnecting said coupling is controlled by a target revolution speed at a time of finishing the synchronization and a function of time.

In the control device for a hybrid vehicle according to the present invention, at a time of disconnecting said coupling, the engine torque is decreased and motor torque is increased.

In the control device for a hybrid vehicle according to the present invention, at a time of disconnecting said coupling, said power generating motor is controlled in zero torque until a disconnecting operation of said coupling is started, and said power generating motor is controlled in revolution speed after the disconnection is started.

According to the present invention, when a shift between the motor drive mode in which the vehicle is driven by the drive motor and the engine drive mode in which the vehicle is driven by the engine is executed, no gap between drive forces in the respective modes occurs and therefore it is possible to be continuously and smoothly shifted without generating any change shock. Since difference between the revolution speeds is reduced when the shift is made between both modes, it is possible to smoothly shift the modes without generating any change shock. Concurrently, a mechanical coupling, for example, a two-way clutch or the like can be used as the coupling. Accordingly, it is possible to make the structure of the hybrid vehicle simple and compact.

According to the present invention, since the coupling can be connected irrespective of a load change of the drive motor and the power generating motor, an impact applied to the coupling becomes always small and a durability of the coupling is improved. Since the coupling can be connected irrespective of a power generation state by the power generating motor, it is possible to charge the battery even while the revolution speed is synchronized. It is possible to elongate a time for synchronizing the revolution speed. Therefore, if the vehicle speed is rapidly changed during the rotation synchronization, working frequency of the connection and disconnection of the coupling is reduced by stopping a mutual transition between the motor drive and the engine drive before the coupling is engaged. Accordingly, it is possible to improve a durability of the coupling.

DESCRIPTION OF THE PREFERRED EMBODIMENTS

Hereinafter, an embodiment of the present invention will be detailed based on the accompanying drawings.

Figure 1:
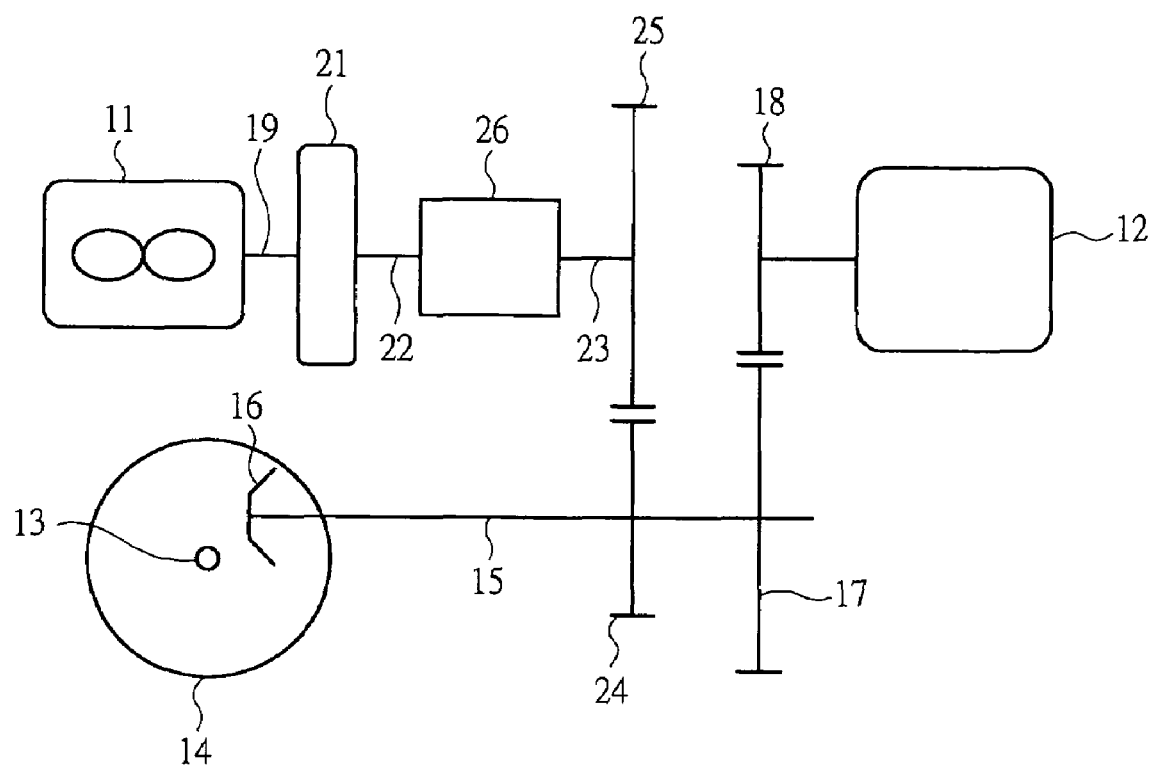
FIG. 1 is a schematic view showing a power transmission system for a hybrid vehicle.

FIG. 1 is a schematic view showing a power transmission system for a hybrid vehicle. The power transmission system has an engine 11 and a drive motor 12 as a source of power for a vehicle, and is used in a front-wheel drive vehicle. An axle 13 connected to front wheels serving as drive wheels is attached to a differential gear mechanism (not shown), and a final reduction small gear 16 provided on a front-wheel drive shaft 15 is engaged with a final reduction large gear 14 provided in the differential gear mechanism. A drive gear 18 mounted on a main shaft of the drive motor 12 is engaged with a driven gear 17 for speed reduction, which is provided on the front-wheel drive shaft 15, and a motor-power transmission path is formed from the main shaft of the drive motor 12 to the front-wheel drive shaft 15.

A power generating motor 21 is mounted on a crank shaft 19 of the engine 11, and the power generating motor 21 has a rotor fixed to the crank shaft 19. A drive gear 25 engaged with a speed-reducing driven gear 24 provided on the front-wheel drive shaft 15 is provided on an engine-power transmission shaft 23 which is concentric with a rotor output shaft 22 connected to the rotor, and the engine-power transmission path is formed from the crank shaft 19 to the front-wheel drive shaft 15. A coupling 26 for shifting engine power to a connection state in which the engine power is transmitted to the drive wheels and to a disconnection state in which the transmission is cut off is provided between the rotor output shaft 22 and the engine-power transmission shaft 23. A two-way clutch corresponding to a mechanical clutch is used as the coupling 26, and the rotor output shaft 22 and the engine-power transmission shaft 23 are changed to the connection state and the disconnection state by an electromagnet.

The power generating motor 21 has a function serving as a starter motor in addition to a function of charging electric power to a battery by being driven by the engine, and the crank shaft 19 is rotated by the power generating motor 21 at a time of starting the engine. Further, since the function serving as a power generator is applied to the drive motor 12, the drive motor 12 can generate power by a regenerative energy at a time of braking and charge the battery with the electric power. Note that the power transmission system shown in FIG. 1 is employed in the front-wheel drive vehicle, but if the power transmission system is applied to a four-wheel drive vehicle in which rear wheels are set also as drive wheels, the main shaft of the drive motor 12 or the front-wheel drive shaft 15 requires being linked to a rear-wheel drive shaft via a power distribution apparatus. Further, the engine-power transmission path is provided only with a gear train constituted by the drive gear 25 and the driven gear 24, but the transmission may be provided to the engine power transmission path by arranging plural stages of transmission gear trains in the engine-power transmission path.

The hybrid vehicle, on which the above-mentioned power transmission system is mounted, has the power generating motor 21 in addition to the engine 11 and the drive motor 12, whereby the driving of the vehicle is shifted to the driving by any one of the engine 11, the drive motor 12, and both in accordance with a running state. For example, the vehicle can be driven by use of the drive motor 12 at a starting time when the drive torque is required, and the vehicle can be driven by the engine 11 if the vehicle speed is increased, and the vehicle can be driven by the drive motor 12 and the engine 11 at a high-load running time such as a uphill running time.

When the coupling 26 is connected under a state in which the power only by the drive motor 12 is transmitted to the drive wheels, the engine power is transmitted to the drive wheels. At this time, if the drive motor 12 is driven, the engine power and the motor power are transmitted to the drive wheels. Meanwhile, when the coupling 26 is discon-nected under a state in which the power of the engine 11 is transmitted to the drive wheels, the transmission of the engine power is cut off and the power of the drive motor 12 can be transmitted to the drive wheels. Accordingly, a running mode of the vehicle having such a power transmission system includes a motor drive mode in which only the drive motor 12 is set to a drive source, and an engine drive mode in which the engine 11 is set to a drive source. Even when both of the engine 11 and the drive motor 12 are set to the drive source, the running mode of the vehicle is the engine drive mode. Therefore, since the power of both is transmitted, this mode may be called also a parallel running mode.

Figure 2A:
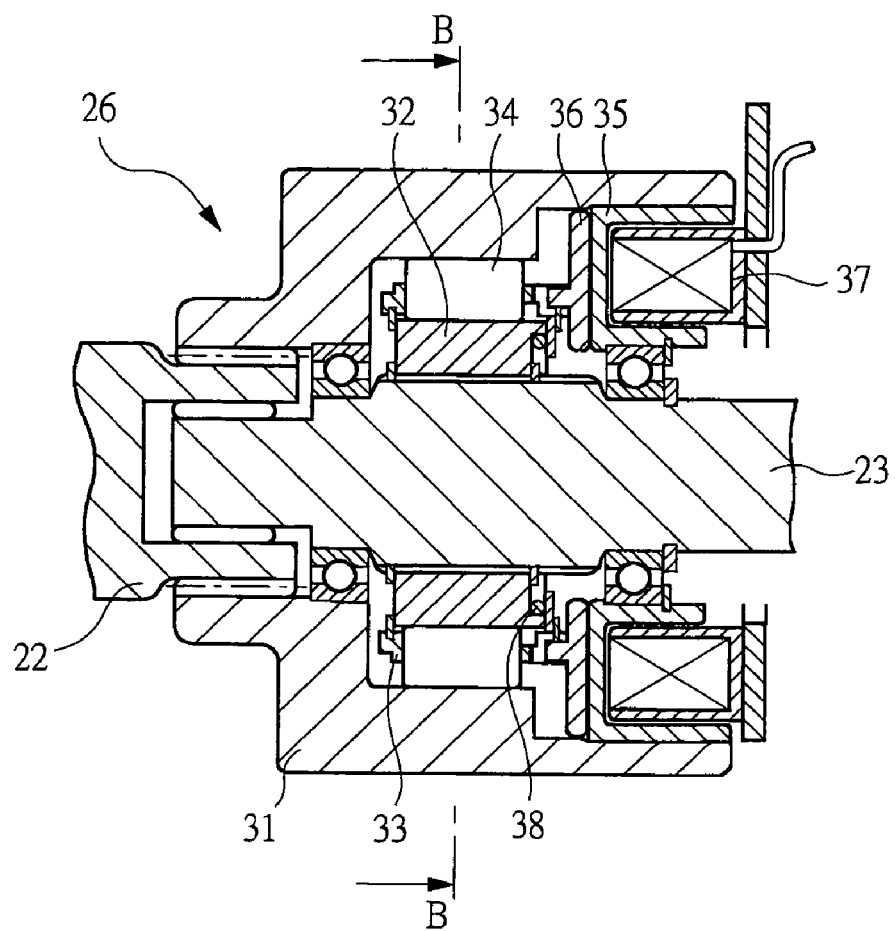
FIG. 2A is a sectional view showing an example of a coupling.
Figure 2B:
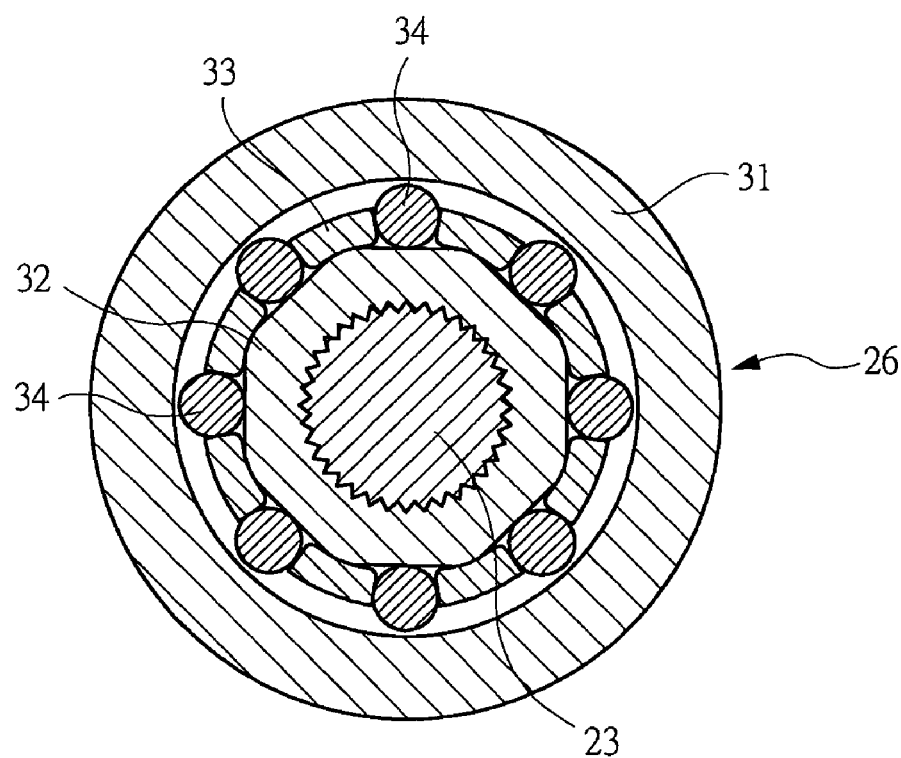
FIG. 2B is a sectional view taken along B—B line in FIG. 2A.

FIGS. 2A and 2B are sectional views showing an example of the coupling 26. The coupling 26 has an outer ring 31 formed by a case body spline-connected to the rotor output shaft 22 serving as an input-side shaft, and an inner ring 32 disposed in a cylinder portion of the outer ring 31 and spline-connected to the engine-power transmission shaft 23 serving as an output-side shaft. A cylindrical cage 33 is assembled in the outer ring 31 so as to cover the inner ring 32, and a plurality of rollers 34 are arranged on the cage 33. An inner peripheral surface of the cylinder portion in the outer ring 31 is formed into a cylindrical shape while an outer peripheral surface of the inner ring 32 is formed into a polygonal shape and a plurality of cam surfaces are formed on the outer peripheral surface. An interval between the inner peripheral surface of the outer ring 31 and the outer peripheral surface of the inner ring 32 is changed depending on positions located in a circumferential direction, and the largest interval is set to be larger than an outer diameter of the roller 34. A friction flange 35 is fixed to the outer ring 31, and an armature 36 is fixed to the cage 33 so as to oppose to the friction flange 35. An electromagnetic coil 37 is fixed to a gear case (not shown) on a vehicle-body side so as to oppose to the friction flange 35.

A switch spring 38, which applies a spring force to the cage 33 in a direction of disposing each of the rollers 34 at a center portion and in a circumferential direction of each flat surface of the inner ring 32, is provided between the inner ring 32 and the cage 33. For this reason, when a current does not flow in the electromagnetic coil 37, as shown in FIG. 2B, the rollers 34 are disposed at the center portion and in the circumferential direction by the switch spring 38 and are held in such a positional relation as not to simultaneously contact with both of the inner ring 32 and the inner peripheral surface of the outer ring 31. Accordingly, when no current flows in the electromagnetic coil 37, the outer ring 31 becomes rotatable in forward and backward directions with respect to the inner ring 32 without being connected to the inner ring 32 via the rollers 34.

Meanwhile, when a current flows in the electromagnetic coil 37, the armature 36 is drawn to the friction flange 35, so that the outer ring 31 and the cage 33 are integrally rotated. When the cage 33 is rotate and moved together with the outer ring 31, the roller 34 is connected between the outer peripheral surface of the inner ring 32, i.e., a cam surface and the inner peripheral surface of the outer ring 31, so that the outer ring 31 can be integrally rotated in both the forward and backward directions together with the inner ring 32. Accordingly, if the current flows in the electromagnetic coil 37, the outer ring is shifted to the connection state in which the power can be transmitted. In contrast, if no current flows in the electromagnetic coil 37, the outer ring is shifted to the disconnection state in which the power transmission is cut off.

Figure 3:
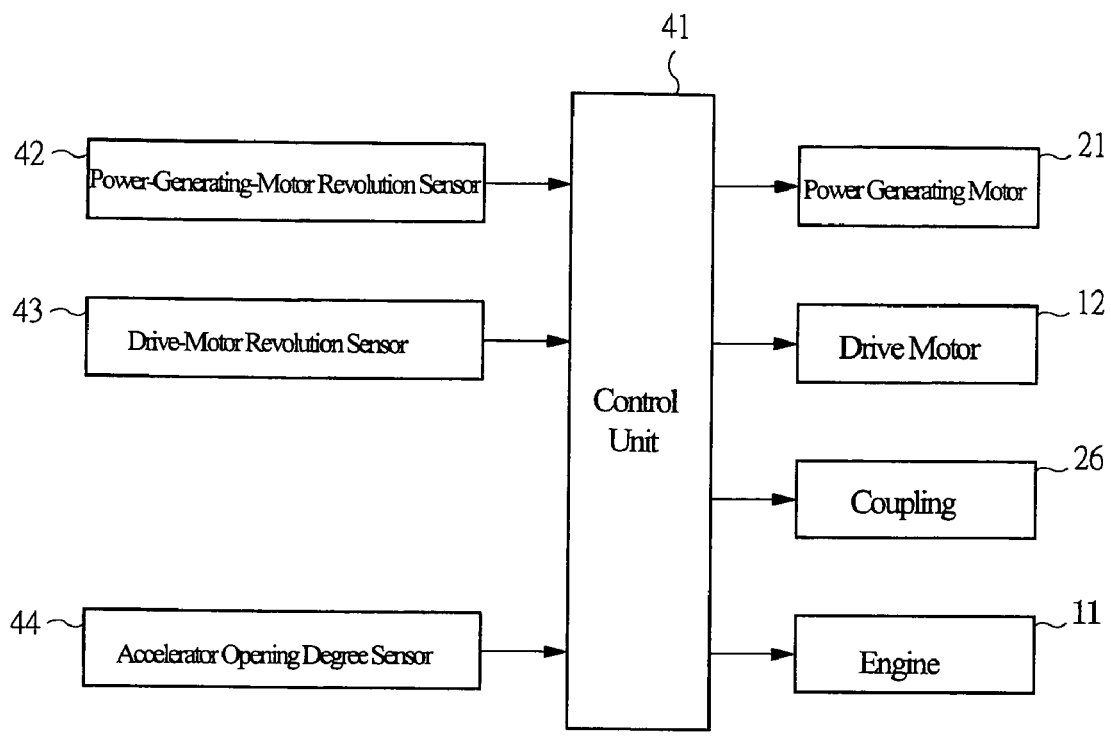
FIG. 3 is a block diagram showing a control circuit of a hybrid vehicle having the power transmission system in FIG. 1.

FIG. 3 is a block diagram showing a control circuit of the hybrid vehicle having the power transmission system shown in FIG. 1. Detection signals are inputted to a control unit 41 from a power-generating-motor revolution sensor 42 for detecting a revolution speed of the power generating motor 21, a drive-motor revolution sensor 43 for detecting a revolution speed of the drive motor 12, an accelerator opening degree sensor 44 for detecting a pedaling amount of an accelerator pedal by a driver, and the other sensors. Control signals are sent to the engine 11, the drive motor 12, the power generating motor 21, and the electromagnetic coil 37 of the coupling 26 from the control unit 41. Note that the control unit 41 is provided with a microprocessor arithmetically operating the control signal, a ROM storing a control program, an arithmetic expression, and map data, etc., a RAM temporarily storing data, and the like.

Figure 4:
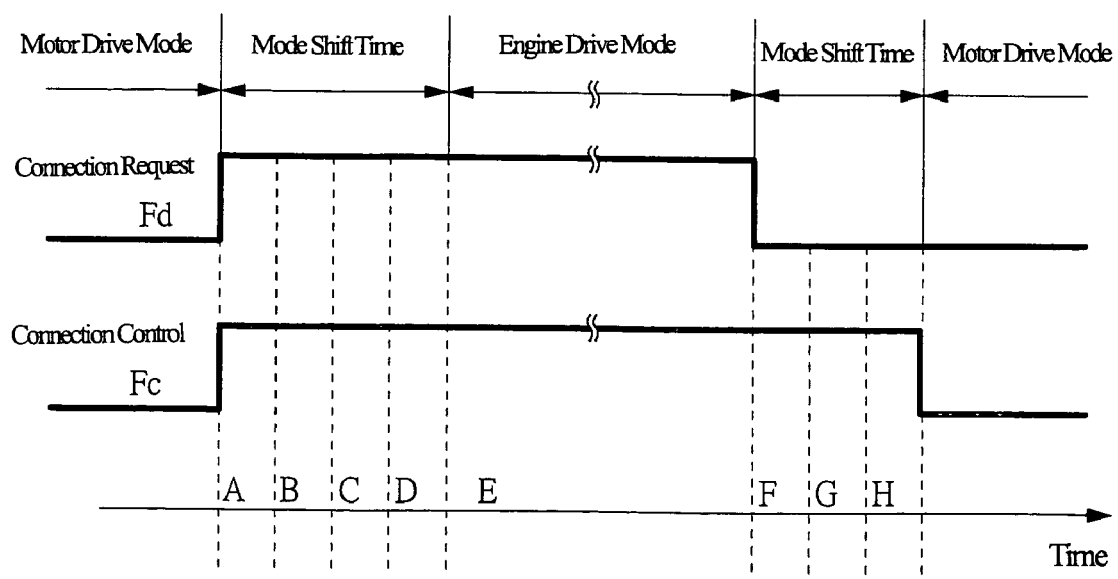
FIG. 4 is a time chart showing control states at a time of connecting a coupling and at a time of disconnecting the coupling

FIG. 4 is a time chart showing operational control states of the coupling 26 by a connection request signal Fd of the coupling 26 arithmetically operated by the control unit 41 in accordance with a running state of the vehicle and a clutch control signal Fc arithmetically operated based thereon. As shown in FIG. 4, in accordance with the running state of the vehicle, if it is determined that the running state of the motor drive mode should be shifted to the engine drive mode, the running state is shifted to an engine direct-coupled phase E via each of control stages or control steps, that is, each of phases A to D. Meanwhile, if it is determined that the running state of the engine direct-coupled phase E should be shifted to the motor drive mode, the running state is shifted to the motor drive mode via phases F to H. A mutual shift of the motor drive mode and the engine drive mode is determined depending on whether at least one of the vehicle required torque and the vehicle speed becomes equal to or larger than a predetermined value, or equal to or smaller than the predetermined value. The required torque is determined depending on the accelerator opening degree and the engine speed, and the vehicle speed is determined by detecting the revolution speed of the main shaft of the drive motor 12 and arithmetically operating it. Note that shift conditions between the respective modes may be determined by other factors indicating the running state.

Figure 7:
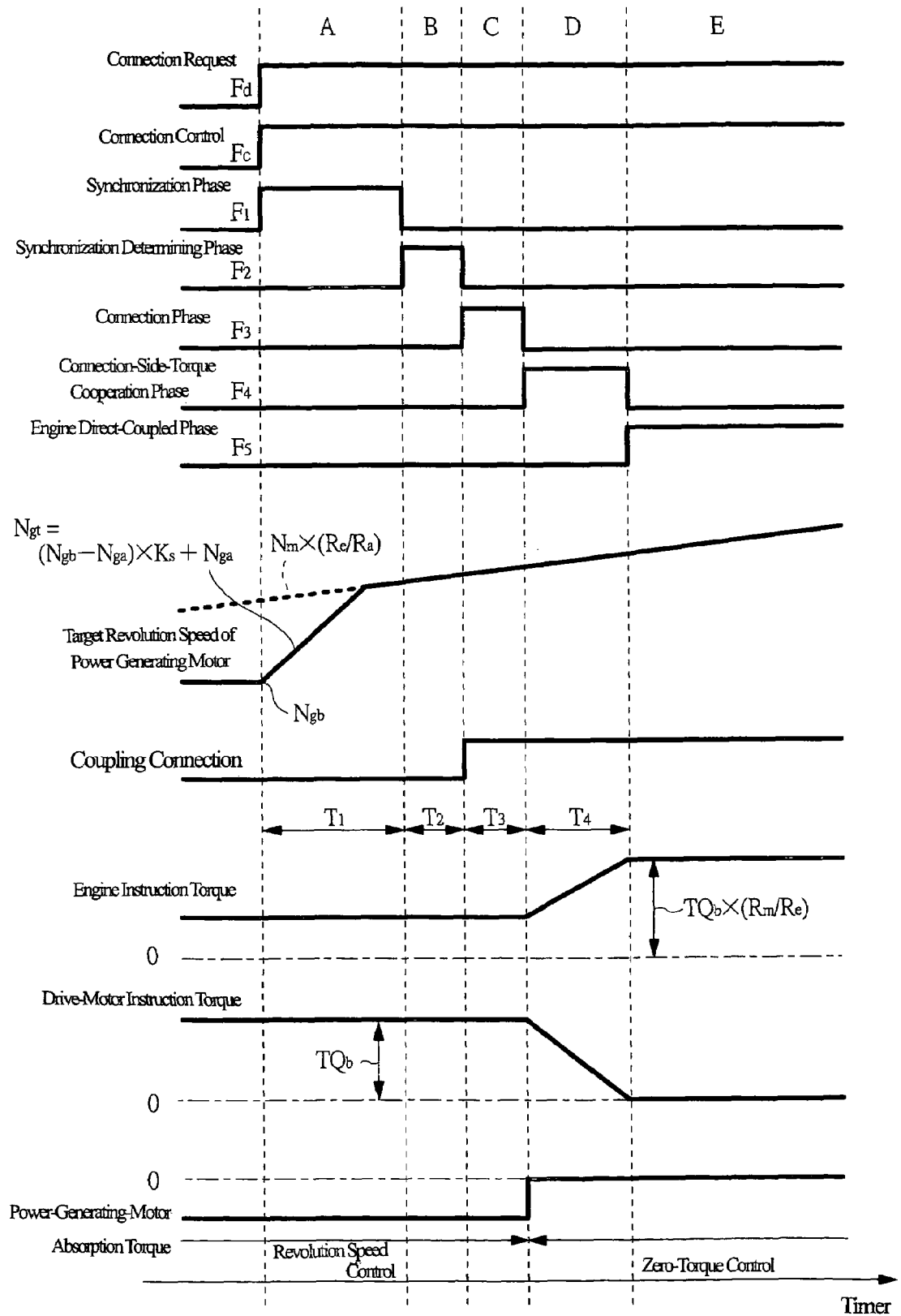
FIG. 7 is a time chart showing a state change of a power transmission system at a shift from a motor drive mode to an engine drive motor.
Figure 8:
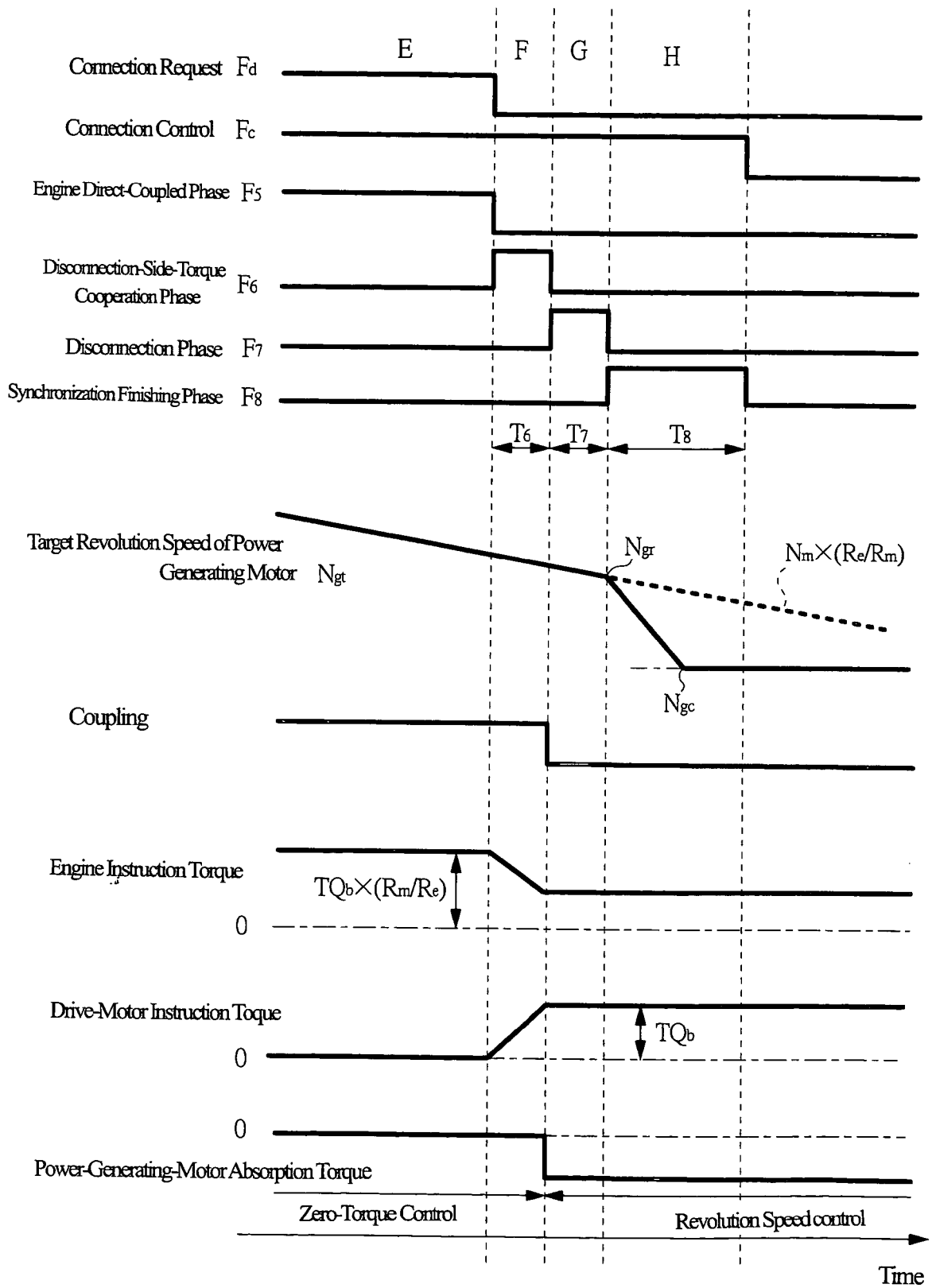
FIG. 8 is a time chart showing a state change of a power transmission system at a shift from an engine drive mode to a motor drive mode.

FIG. 7 is a time chart showing a state change of the power transmission system at a time of shifting from the motor drive mode to the engine drive mode, and FIG. 8 is a time chart showing a state change of the power transmission system at a time of shifting from the engine drive mode to the motor drive mode. As shown in FIG. 7, if it is determined that the state of connecting the coupling 26 is established and the connection request flag Fd is established, that is, the connection request signal is outputted, then the state of the power transmission system becomes the engine direct-coupled phase E through: a synchronization phase A for synchronizing the revolution speeds of the inner ring 32 and the outer ring 31 of the coupling 26; a synchronization determining phase B for determining the synchronization of the revolution speed; a connection phase C for connecting the coupling 26 by carrying a current into the electromagnetic coil 37; and a connection-side-torque cooperation phase D for cooperating with the engine torque and the drive motor torque under the connection state of the coupling 26 and completing the connection thereof. Consequently, the shift to the engine running mode is finished. When exceeding a speed of 80 km/h, the vehicle is set to be shifted from the motor drive mode to the engine drive mode. The value of the vehicle speed can be optionally set, and the vehicle speed shifted from the engine drive mode to the motor drive mode may be also set similarly, and hysteresis may be provided based on directions of the mode shift.

In the synchronization phase A, if it is determined that the state of connecting the coupling 26 is established, the revolution speed of the power generating motor 21 is controlled based on a target revolution speed determined by: a revolution speed of the input-side shaft of the coupling 26 which is the same as the revolution speed of the power generating motor 21 at that time, that is, the engine speed; and the revolution speed of the post-connected power generating motor which is definitely determined by the vehicle speed and the revolution speed of the drive motor 12. In the synchronization determining phase B, it is determined whether the synchronization is established depending on whether a state, in which a difference between the revolution speed of the input-side shaft of the coupling 26, i.e., the revolution speed of the power generating motor 21 and the revolution speed of the output-side shaft, i.e., the engine-power transmission shaft 23 is in a predetermined error range, has passed for a predetermined time. In the connection phase C, power is supplied to the electromagnetic coil 37 to connect the coupling 26, and a predetermined delay time is set in view of an operating time of the coupling 26. In the connection-side-torque cooperation phase D, the engine torque is increased and the motor torque is decreased, whereby a smooth connecting operation can be performed without any shock caused in the shift. Accordingly, the coupling 26 is set to the direct-coupled phase E and the shift from the motor drive mode to the engine drive mode is completed.

As shown in FIG. 7, the revolution speed of the power generating motor 21 is controlled until the connection phase C is finished from the motor drive mode, and the power generating motor 21 is controlled in zero torque at a time of being shifted to the connection-side-torque cooperation phase D and the zero-torque control is executed also in the direct-coupled phase E.

Meanwhile, as shown in FIG. 8, if the coupling 26 is disconnected under the engine running mode and a condition of being shifted to the motor drive mode is established and the coupling request flag Fd is turned off, the state of the power transmission system is shifted to the motor drive mode via: a disconnection-side-torque cooperation phase F for cooperating with the engine torque and the drive motor torque and starting the coupling; a disconnection phase G for stopping carrying a current to the electromagnetic coil 37 and setting the coupling 26 at a disconnecting state; and a synchronization finishing phase H for providing a difference in revolution speed between the inner ring and the outer ring of the coupling 26.

In the disconnection-side-torque cooperation phase F, the engine torque is decreased and the motor torque is increased. In the disconnection phase G, in order to cancel the connection of the coupling 26, the supply of power to the coil 37 is stopped and a predetermined delay time is set in view of the operation time of the coupling 26. In the synchronization finishing phase H, the difference in rotation between the input-side shaft and the output-side shaft of the coupling 26 is provided, so that it is possible to securely cancel the connection even if elements of the coupling 26 corresponding to the mechanical clutch are engaged with each other.

As shown in FIG. 8, the power generating motor 21 is controlled in zero torque until the disconnection-side-torque cooperation phase F is finished from the direct-coupled phase E. When the mode is shifted to the disconnection phase G, the power generating motor 21 is shifted to the revolution-speed control and, in the motor drive mode, the revolution-speed control is executed.

Figure 9:
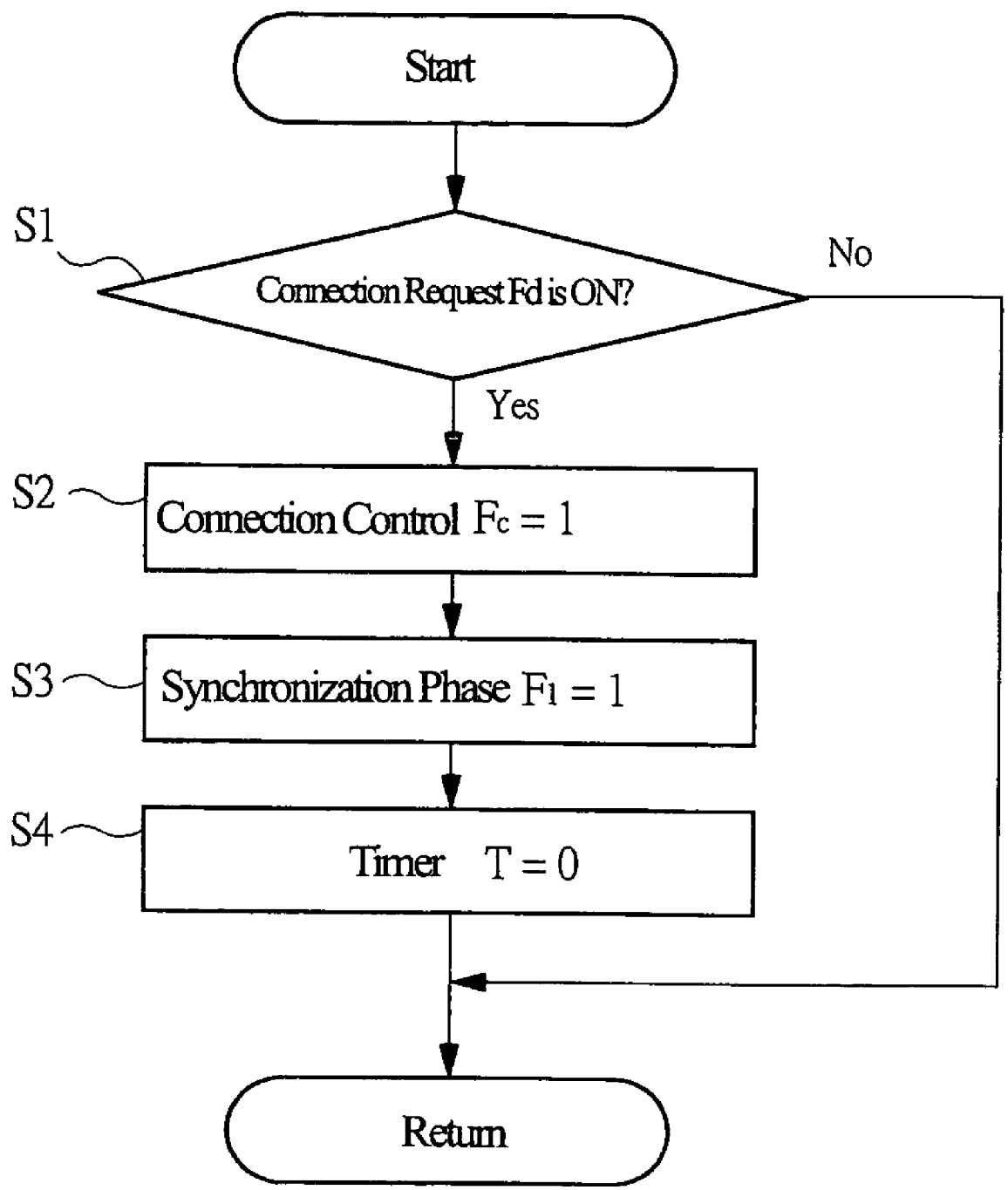
FIG. 9 is a main flow chart showing a control algorithm of a coupling in a power transmission system.
Figure 10:
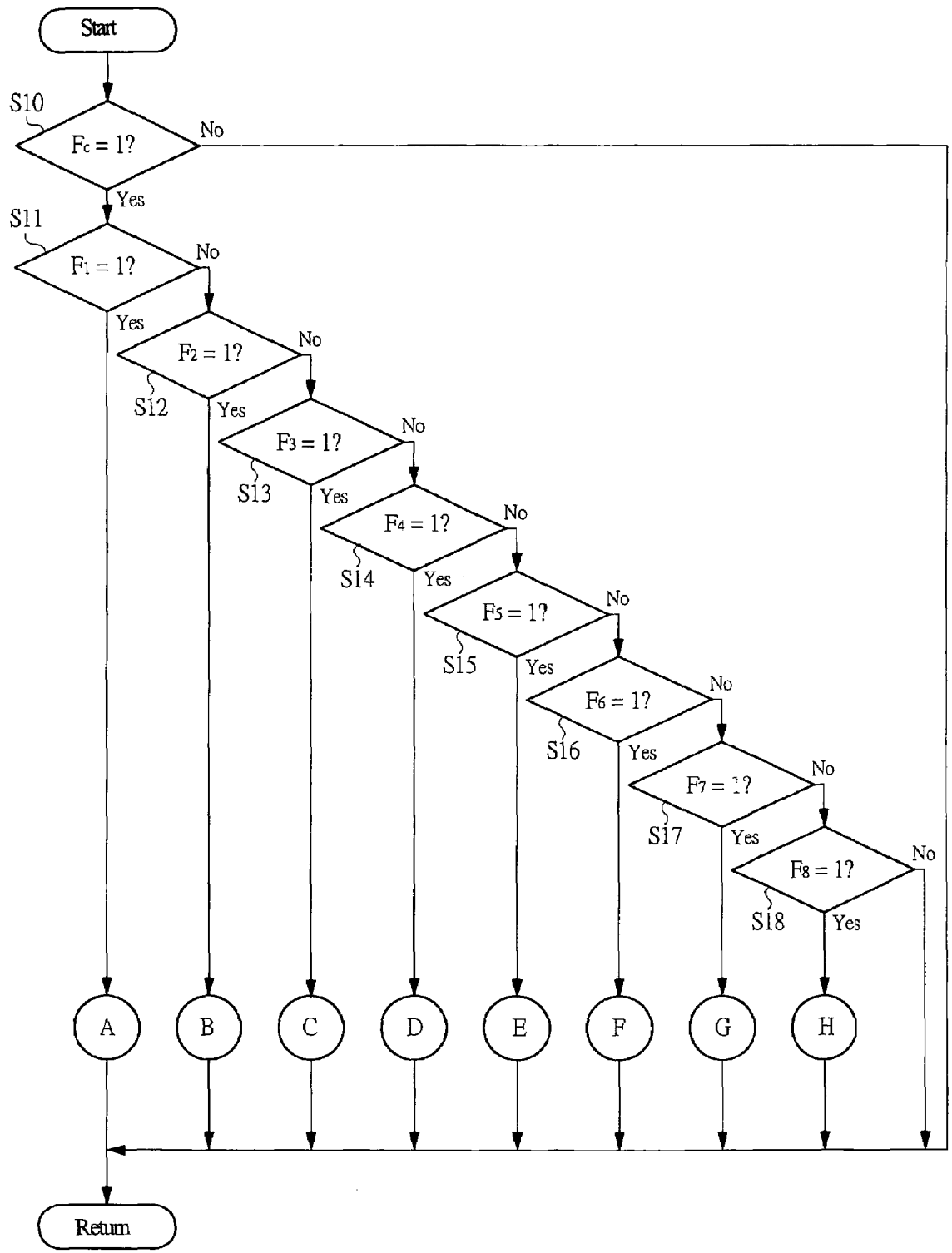
FIG. 10 is a flow chart showing a control algorithm of a shift to each phase as illustrated in FIG. 9.
Figure 11:
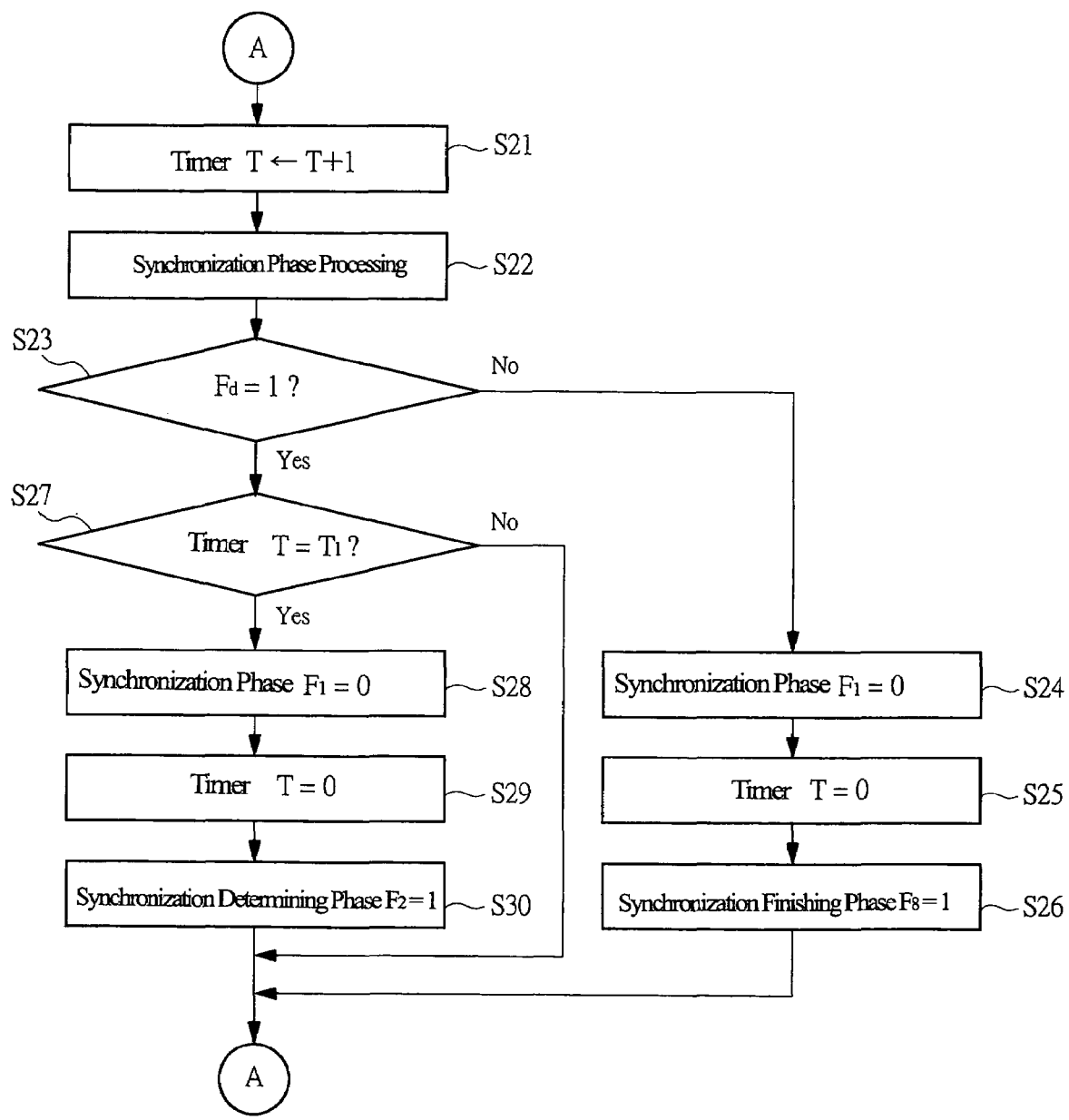
FIG. 11 is a flow chart showing a synchronization phase.

FIG. 9 is a main flow chart showing a control algorithm of the coupling 26 in the above-mentioned power transmission system, and FIG. 10 is a flow chart showing a transition-control algorithm to each of the above-mentioned phases. If it is determined that a condition where the coupling 26 set in the connecting state is shifted to the engine drive mode is established, the connection request flag Fd is established based on the connection request signal. If this is determined in step S1 of FIG. 9, the connection control flag Fc is established in step S2 and the synchronization phase flag F1 is established in step S3 and a timer is reset in step S4. Meanwhile, if it is determined in the step S1 that the vehicle is not in the running state of setting the coupling 26 to the connecting state but in a state of being shifted to the motor drive mode, control routine is returned and a revolution speed Nge of the power generating motor 21 at that time is read and the revolution speed of the power generating motor 21 is set at a revolution speed Ngb of the power generating motor before establishment of the connection condition.

In each of steps S10 to S18 shown in FIG. 10, if it is determined that the condition for being shifted to each of the above-mentioned phases is established, each subroutine denoted by reference symbols "A" to "H" is executed.

(Synchronization Phase A)

FIGS. 11 to 18 are flow charts showing each of subroutines indicated by the reference symbols "A" to "H" in FIG. 10. If it is determined by the steps S10 and S11 shown in FIG. 10 that the mode is shifted to the synchronization phase A, a timer T is incremented in step S21 shown in FIG. 11 and a synchronization phase processing is executed in step S22. In this step S22, the target revolution speed Ngt of the power generating motor 21 is calculated, and the calculated revolution speed is instructed to the power generating motor 21.

Since the rotor of the power generating motor 21 is directly coupled to the crank shaft 19 of the engine 11, the target revolution speed Ngt of the power generating motor 21 is controlled by the engine 11, so that the target revolution speed Ngt is calculated based on a difference between the revolution speed before connection of the coupling 26 and the revolution speed after connection of the coupling 26 in accordance with the following formula.

Target Revolution Speed $Ngt=(Ngb-Nga)\times Ks+Nga$,
and $Nga=Nm\times(Re/Rm)$, where "Ngb" is a revolution speed of the power generating motor 21 before the connection of the coupling 26, "Nga" is a revolution speed of the power generating motor 21 after the connection of the coupling, "Ks" is a revolution synchronization coefficient, "Nm" is a revolution speed of the drive motor 12, "Re" is a speed reduction ratio of a gear train constituted by two gears 24 and 25 in the engine-power transmission path, and "Rm" is a speed reduction ratio of a gear train constituted by two gears 17 and 18 in the motor-power transmission path.

In accordance with the synchronization phase processing, as shown in FIG. 7, the revolution speed of the power generating motor 21 is controlled so that the revolution speed Ngb before the connection of the coupling coincides with a value obtained by multiplying the revolution speed of the drive motor 12 shown by the broken line by the speed reduction ratios of two gear trains, that is, with the revolution speed of the engine-power transmission shaft 23. Note that the revolution speed of the engine-power transmission shaft 23 coincides with the revolution speed of the inner ring 32 of the coupling 26.

Figure 5A:
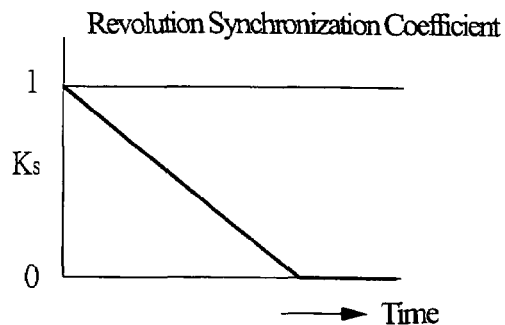
FIG. 5A is a characteristic diagram showing a revolution synchronization coefficient.

FIG. 5A is a characteristic diagram showing a revolution synchronization coefficient Ks. The coefficient Ks is changed as illustrated in accordance with progress of the synchronization phase A counted by the timer.

In step S23, it is determined whether the coupling connection request is cancelled, i.e., whether the connection request flag Fd is in failure at a time when the synchronization phase A is executed. If it is determined in the step S23 that the connection request is cancelled, the synchronization phase flag F1 is set to failure in step S24 and the timer T is rest in step S25 and the synchronization finishing phase flag F8 is established in step S26.

Meanwhile, if it is determined in the step S23 that the connection request flag Fd remains established, it is determined in step S27 whether a preset synchronization phase time T1 has passed. If it is determined in the step S27 that the time T1 has not passed, the routine is returned. If it is determined that the time T1 has passed, the synchronization phase flag F1 is set to failure and the timer T is reset and the synchronization determining phase flag F2 is established (steps S28 to S30). By doing so, the mode is shifted to the synchronization determining phase B shown in FIG. 12.

(Synchronization Determining Phase B)

Figure 12:
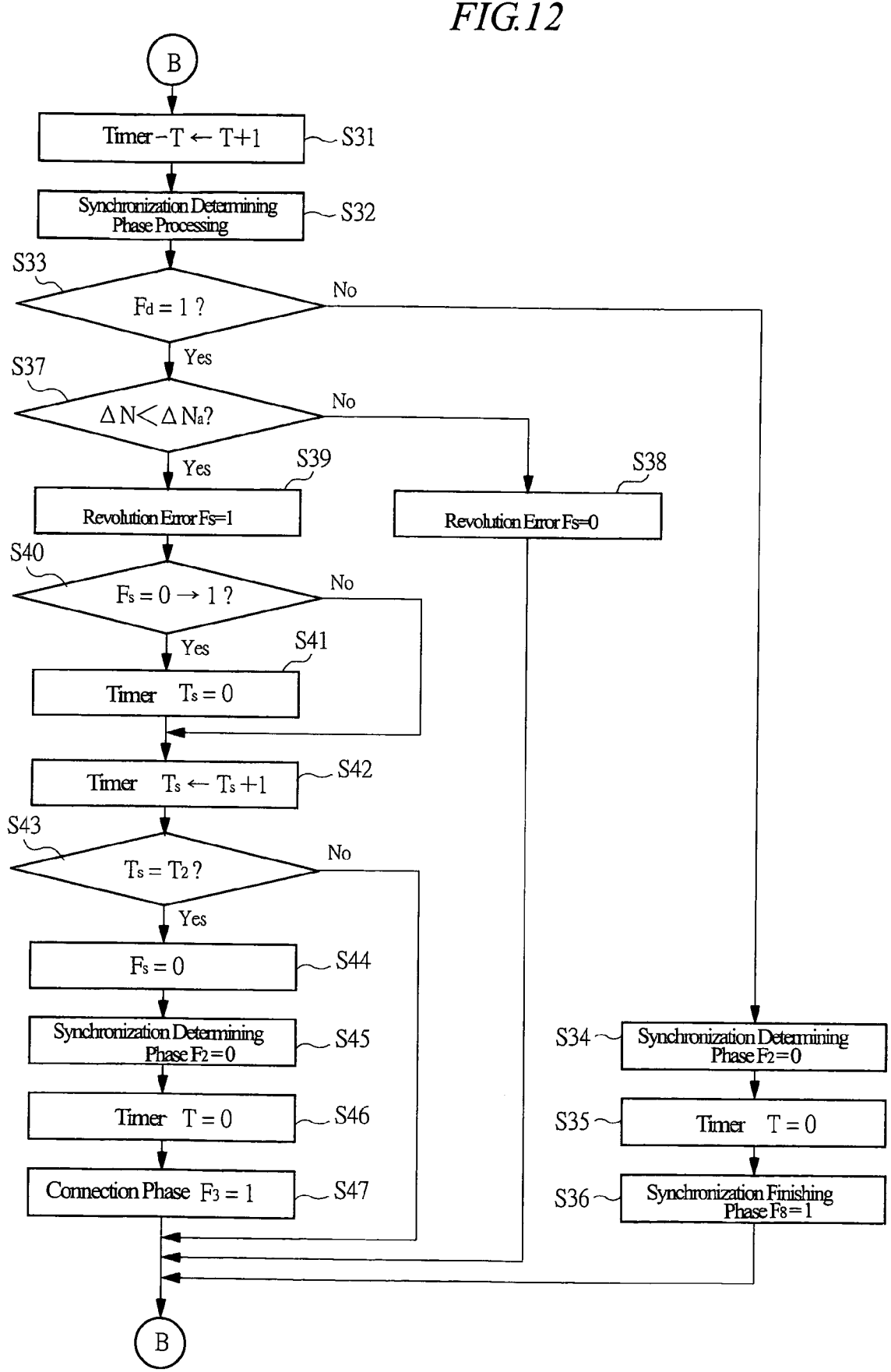
FIG. 12 is a flow chart showing a synchronization determining phase.
Figure 13:
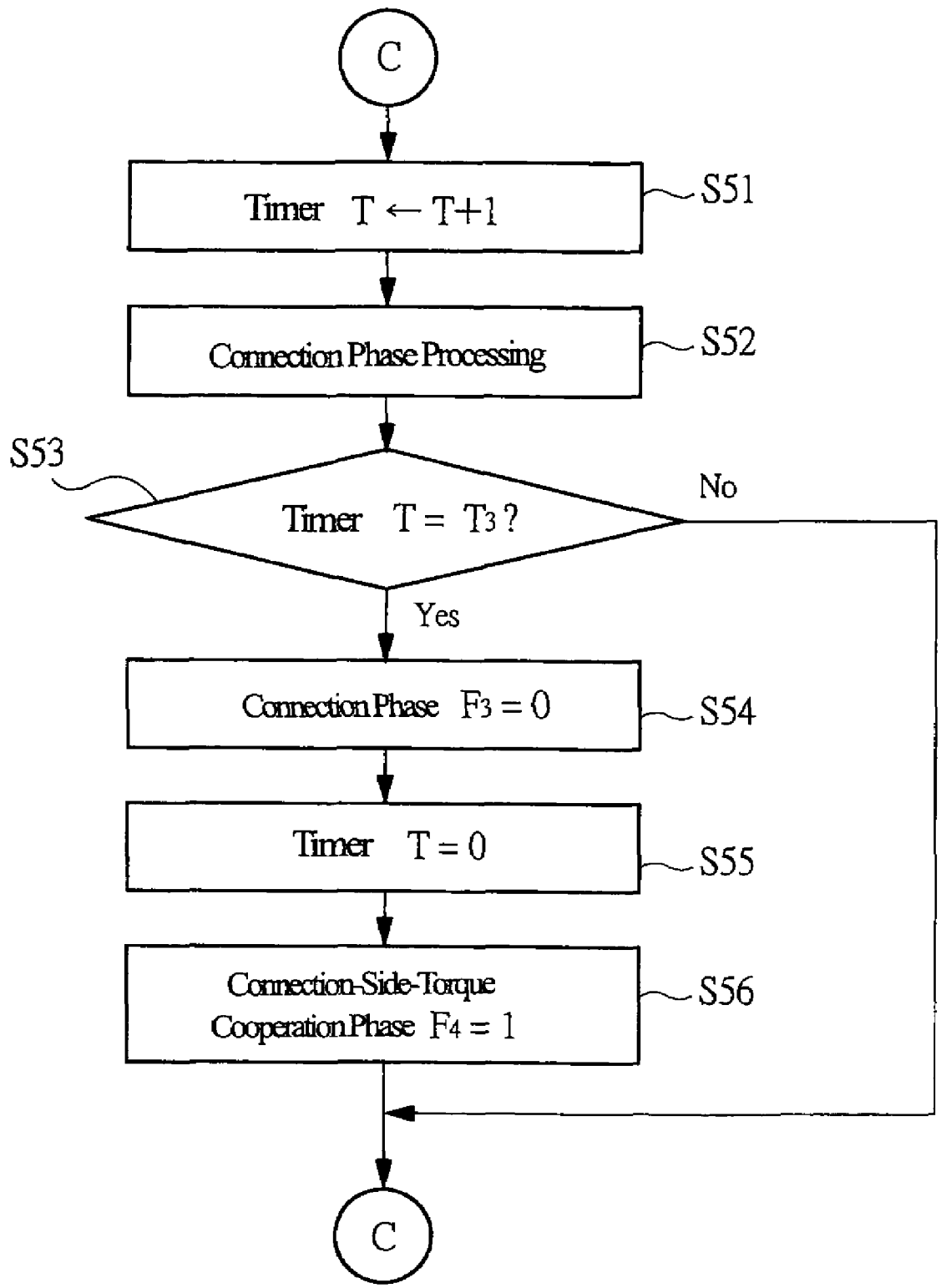
FIG. 13 is a flow chart showing a connection phase.
Figure 14:
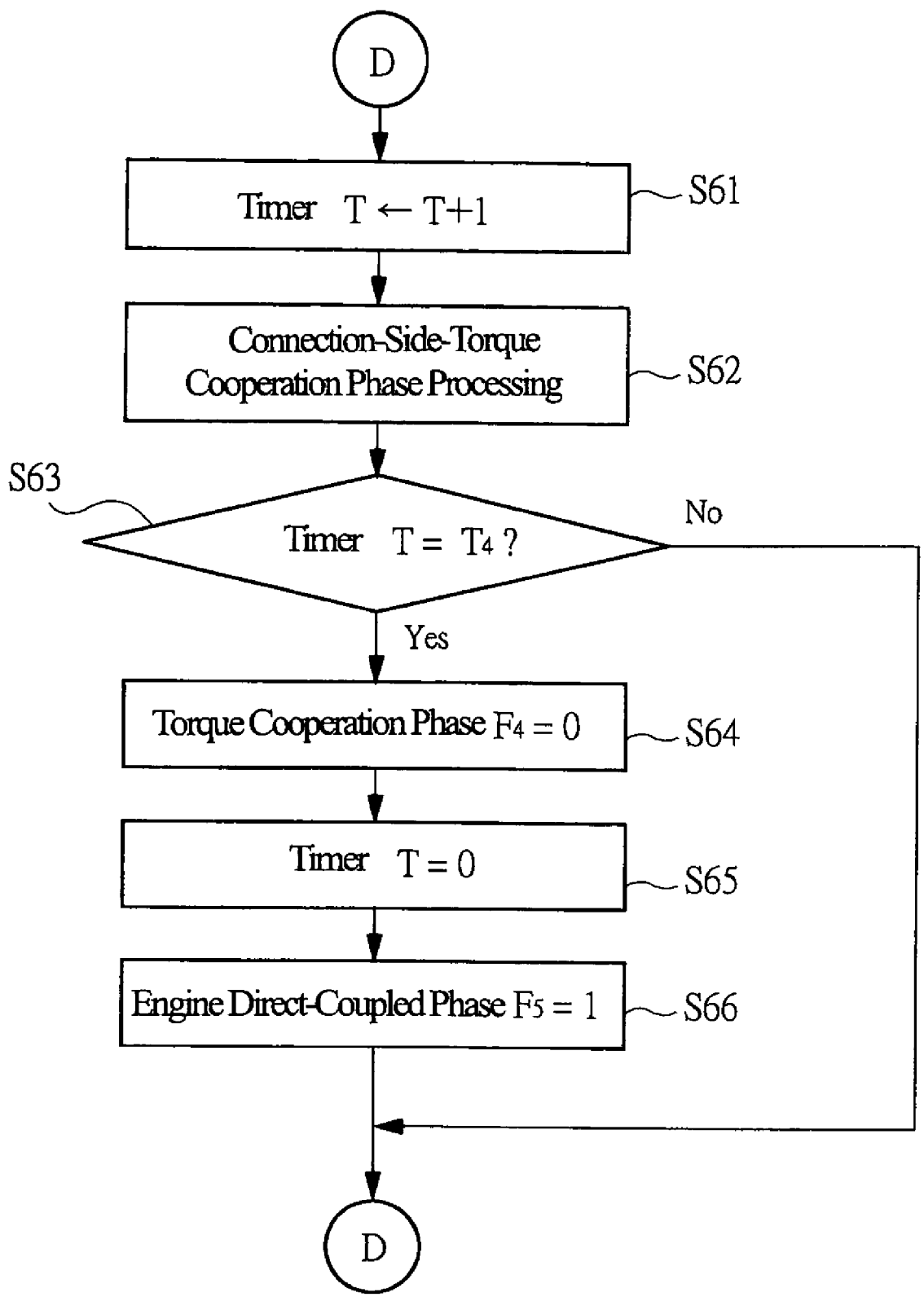
FIG. 14 is a flow chart showing a connection-side-torque cooperation phase.

As shown in FIG. 12, the timer T is incremented in step S31, and the synchronization determining phase processing is executed in step S32. In this processing, the revolution speed of the power generating motor 21 is controlled, and the target revolution speed Ngt of the power generating motor 21 is calculated by the following formula and an instruction signal is sent to the power generating motor 21. Engine instruction torque TQet is set in the same manner as the synchronization phase A.

Target Revolution Speed $Ngt=Nm\times(Re/Rm)$.

In this formula, "Nm" is a revolution speed of the drive motor 12, "Re" is a speed reduction ratio of the gear train in the engine-power transmission path, and "Rm" is a speed reduction ratio of the gear train in the motor-power transmission path. In the step S32 of the synchronization determining phase processing, a revolution speed error ΔN between the target revolution speed Ngt and the actual revolution speed Nge of the power generating motor 21 is determined (ΔN=|Ngt−Nge|).

If the connection request flag Fd is in failure at a time when the synchronization determining phase processing is executed, the synchronization determining phase flag F2 is set to failure and the timer T is reset and the synchronization finishing phase flag F8 is established (steps S34 to S36). Meanwhile, if it is determined that the connection request flag Fd is still established, it is determined in step S37 whether the revolution speed error ΔN is larger than the maximum value ΔNa of the error. When it is determined in the step S37 that the revolution speed error ΔN is larger than the maximum value ΔNa, step S38 is executed and a rotation error flag Fs is set to failure. When it is determined that the revolution speed error ΔN is smaller than the maximum value ΔNa, the revolution error flag Fs is established in step S39.

It is determined in step S40 whether the revolution error flag Fs is shifted to the establishment from the failure. If it is determined that it is shifted, a synchronization timer Ts is reset in step S41 and the timer is incremented in step S42. It is determined in step S43 whether the synchronization timer Ts passes continuously a synchronization determining time T2. If it is determined that it is continued, the revolution error flag Fs is set to failure, the synchronization determining phase flag F2 is set to failure and the timer T is reset and the connection phase flag F3 is established (steps S44 to S47).

(Connection Phase C)

If the connection phase flag F3 is established in step S47, the connection signal is outputted and the timer T is incremented in step S51 and the connection phase processing is executed in step S52. In this processing, the revolution speed of the power generating motor 21 is controlled, and the target revolution speed Ngt of the power generating motor is calculated by the following formula and the instruction signal is sent to the power generating motor 21. The engine instruction torque TQet is set in the same manner as the synchronization phase A.

Target revolution speed $Ngt=Nm \times (Re/Rm)$, where "Nm" is a revolution speed of the drive motor 12, "Re" is a speed reduction ratio of the gear train in the engine-power transmission path, and "Rm" is a speed reduction ratio of the gear train in the motor-power transmission path.

It is determined in step S53 whether the rotations of the outer ring 31 and the inner ring 32 of the coupling 26 are in a synchronous state. This determination is executed based on whether the timer T is equal to a preset connection phase time T3. If the connection phase time T3 has passed, the connection phase flag F3 is set to failure and the timer T is reset and a connection-side-torque cooperation phase flag F4 is established (steps S54 to S56). If the connection-side-torque cooperation flag F4 is not established, the power generating motor 21 is controlled in zero torque.

(Connection-Side-Torque Cooperation Phase D)

If the connection-side-torque cooperation phase D is executed, the timer T is incremented in step S61 and the connection-side-torque cooperation phase processing in step S62 is executed. In this processing, the engine instruction torque TQet is calculated based on vehicle required torque TQb generated on the main shaft of the drive motor 12 by the following formula.

Engine Instruction Torque $TQet=TQb \times (Rm/Re) \times Kon$.

Figure 5B:
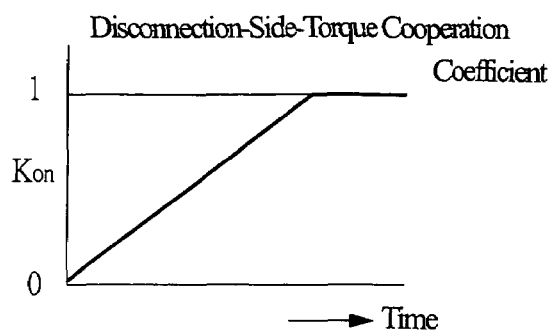
FIG. 5B is a characteristic diagram showing a connection-side-torque cooperation coefficient.

In this formula, "Kon" is a connection-side-torque cooperation coefficient, and the coefficient Kon is changed as shown in FIG. 5B in accordance with a procedure of the connection-side connecting phase processing counted by the timer. Further, the engine instruction torque TQet is set within a range of "TQe≦TQet≦TQea". However, "TQe" is an initial value of the torque-cooperation engine torque, and "TQea" is the maximum value of the engine torque and this value is set every engine rotation.

A value of a throttle opening degree is calculated based on the engine instruction torque TQet and the engine revolution speed, and the throttle opening degree is electronically controlled and the engine torque is adjusted. The calculation of the engine instruction torque TQet may be carried out by the following formula in view of the power generation by the drive motor 12.

Engine Instruction Torque $TQet=TQb \times (Rm/Re) \times Kon+TQg$

In this formula, "TQg" is power generation torque on the crank shaft during the connection.

Next, drive-motor instruction torque TQm is calculated based on the vehicle required torque TQb and the engine instruction torque TQet in accordance with the following formula, and the instruction signal is outputted to the drive motor 12.

Drive-Motor Instruction Torque $TQm=TQb-(TQet \times Re/Rm)$

If it is determined in step S63 that the timer T becomes equal to a preset connection-side cooperation phase time T4, the connection-side phase flag F4 is set to failure and the timer T is reset and the engine connecting phase flag F5 is established.

(Engine Direct-Coupled Phase E)

Figure 15:
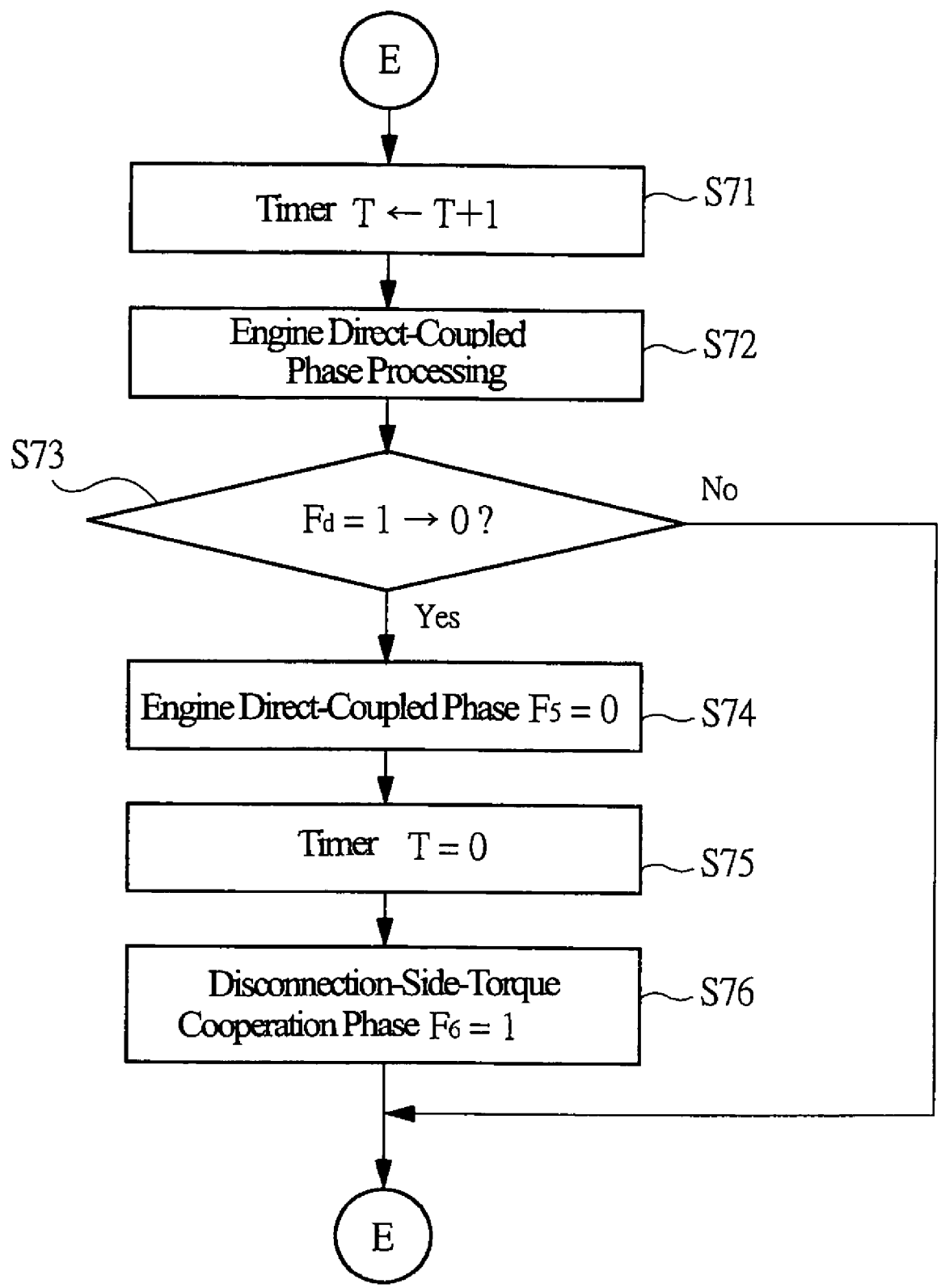
FIG. 15 is a flow chart showing an engine direct-coupled phase.

If the engine direct-coupled phase E is established, the timer T is incremented in step S71 as shown in FIG. 15 and an engine direct-coupled phase in step S72 is executed and the power generating motor 21 is controlled in zero torque at this time. In the engine direct-coupled phase processing, the engine instruction torque TQet and the drive-motor instruction torque TQm are calculated based on the vehicle required torque TQb generated on the drive motor shaft in accordance with the following formula. In the following formula, "TQei" indicates the minimum value of the engine torque, and "TQea" indicates the maximum value of the engine torque.

[1] When (TQb×Rm/Re)<TQei, it is assumed that: Engine Instruction Torque TQet=TQei; and Drive-Motor Instruction Torque TQm=TQb−(TQet×Re/Rm).

[2] When TQei≦(TQb×Rm/Re)≦TQea, it is assumed that: Engine Instruction Torque TQet=TQb×Rm/Re; and Drive-Motor Instruction Torque TQm=0.

[3] When (TQb×Rm/Re)>TQei, it is assumed that: Engine Instruction Torque TQet=TQea; and Drive-Motor Instruction Torque TQm=TQb−(TQet×Re/Rm).

The minimum value TQea of the engine torque is set every engine revolution speed.

The calculation of the engine instruction torque TQet may be carried out by the following formula in view of the power generation by the drive motor 12 during the connection.

Engine Instruction Torque $TQet=TQb \times Rm/Re+TQet$.

The shift from the motor drive mode to the engine drive mode is completed by executing a engine direct-coupled phase processing E, whereby the vehicle is driven by the engine 11. At this time, the power of the drive motor 12 may be transmitted to the vehicle. The engine drive mode is continued until the connection request is cancelled in step S73, that is, until "YES" is determined in the step S73.

If it is determined that the connection request is cancelled depending on the running state of the vehicle and an engine direct-coupled state, the engine direct-coupled phase flag F5 is set to failure and the timer T is reset and the disconnection-side-torque cooperation phase flag F6 is established (steps S74 to S76). Accordingly, the shift from the engine drive mode to the motor drive mode is started.

(Disconnection-Side-Torque Cooperation Phase F)

Figure 16:
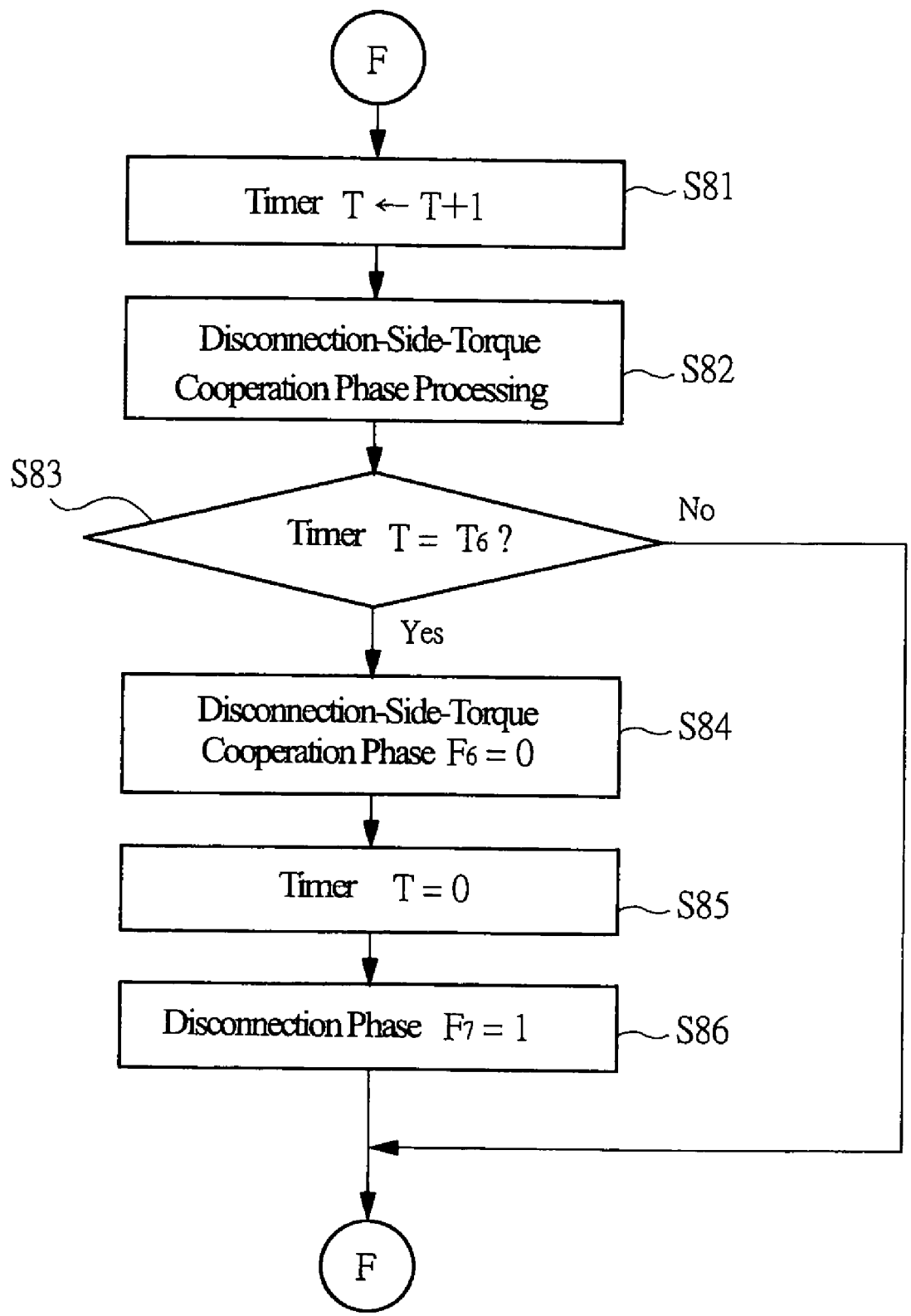
FIG. 16 is a flow chart showing a disconnection-side-torque cooperation phase.

If the control of the disconnection-side-torque cooperation phase F is executed, the timer T is incremented per predetermined control period in step S81 of FIG. 16 and a disconnection-side-torque cooperation phase processing in step S82 is executed. In this processing, the engine instruction torque TQet is calculated based on the vehicle required torque TQb generated on the main shaft of the drive motor 12 in accordance with the following formula:

Engine Instruction Torque $TQet=TQb \times (Rm/Re) \times Koff$.

Figure 6A:
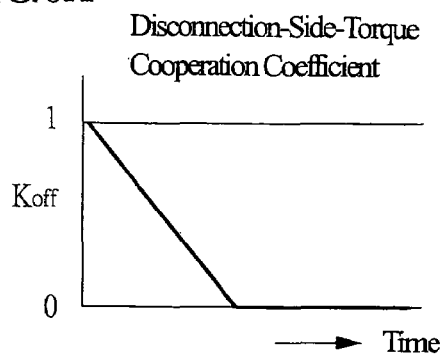
FIG. 6A is a characteristic diagram showing a connection-side-torque cooperation coefficient.

In this formula, "Koff" is a disconnection-side-torque cooperation coefficient, and the coefficient Koff is changed as shown in FIG. 6A depending on a procedure of the torque cooperation phase F counted by the timer. Further, the engine instruction torque TQet is set within a range of "TQ≦TQet≦TQea". In this inequality, "TQe" is an initial value of torque-cooperation engine torque, and "TQea" is the maximum value of the engine torque and this value is set every engine rotation.

Next, the drive-motor instruction torque TQm is calculated based on the vehicle required torque TQb and the engine instruction torque TQet in accordance with the following formula, and the instruction signal is outputted to the drive motor 12.

Drive-Motor Instruction Torque $TQm=TQb-(TQet \times Re/Rm)$.

If it is determined in step S83 that the timer T becomes equal to a preset disconnection-side cooperation phase time T6, the disconnection-side-torque phase flag F6 is set to failure and the timer T is reset and the disconnection phase flag F7 for disconnecting the coupling 26 is established (steps S84 to S86).

(Disconnection Phase G)

Figure 17:
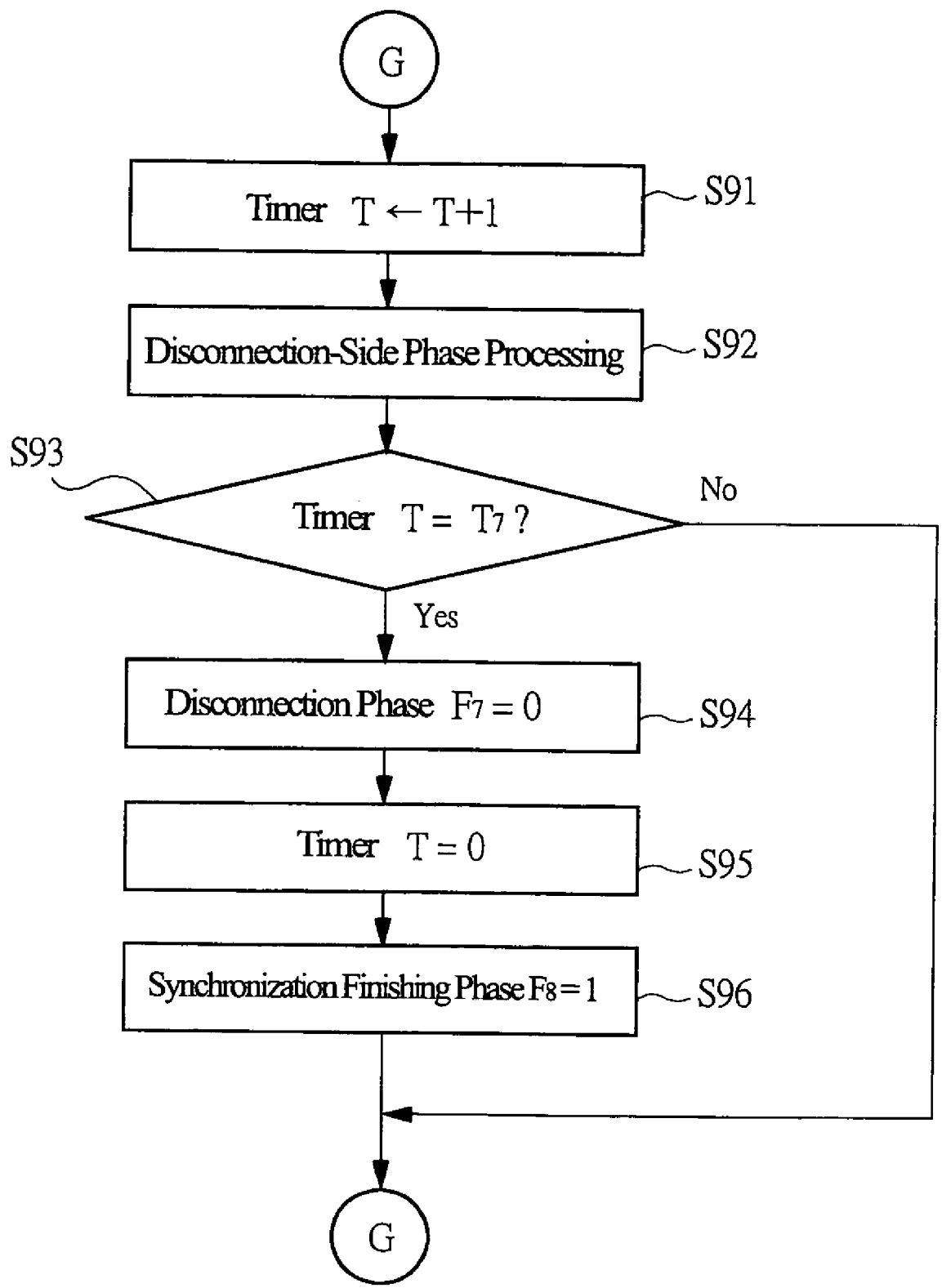
FIG. 17 is a flow chart showing a disconnection phase.

If a disconnection phase flag F7 is established in step S86 of FIG. 16, the timer T is incremented per predetermined control period in step S91 shown in FIG. 17 and the disconnection-side phase processing is executed in step S92. In this processing, the revolution speed of the power generating motor 21 is controlled, the target revolution speed Ngt of the power generating motor 21 is calculated in accordance with the following formula, and the instruction signal is sent to the power generating motor 21.

Target Revolution Speed $Ngt=Nm \times (Re/Rm)$.

The engine instruction torque TQet at this time is set in the same manner as the synchronization phase A. If it is determined in step S93 that the timer T becomes equal to a preset disconnection phase time T7, the disconnection phase flag F7 is set to failure and the timer T is reset and the synchronization finishing phase flag F8 is established (steps S94 to S96).

(Synchronization Finishing Phase H)

Figure 18:
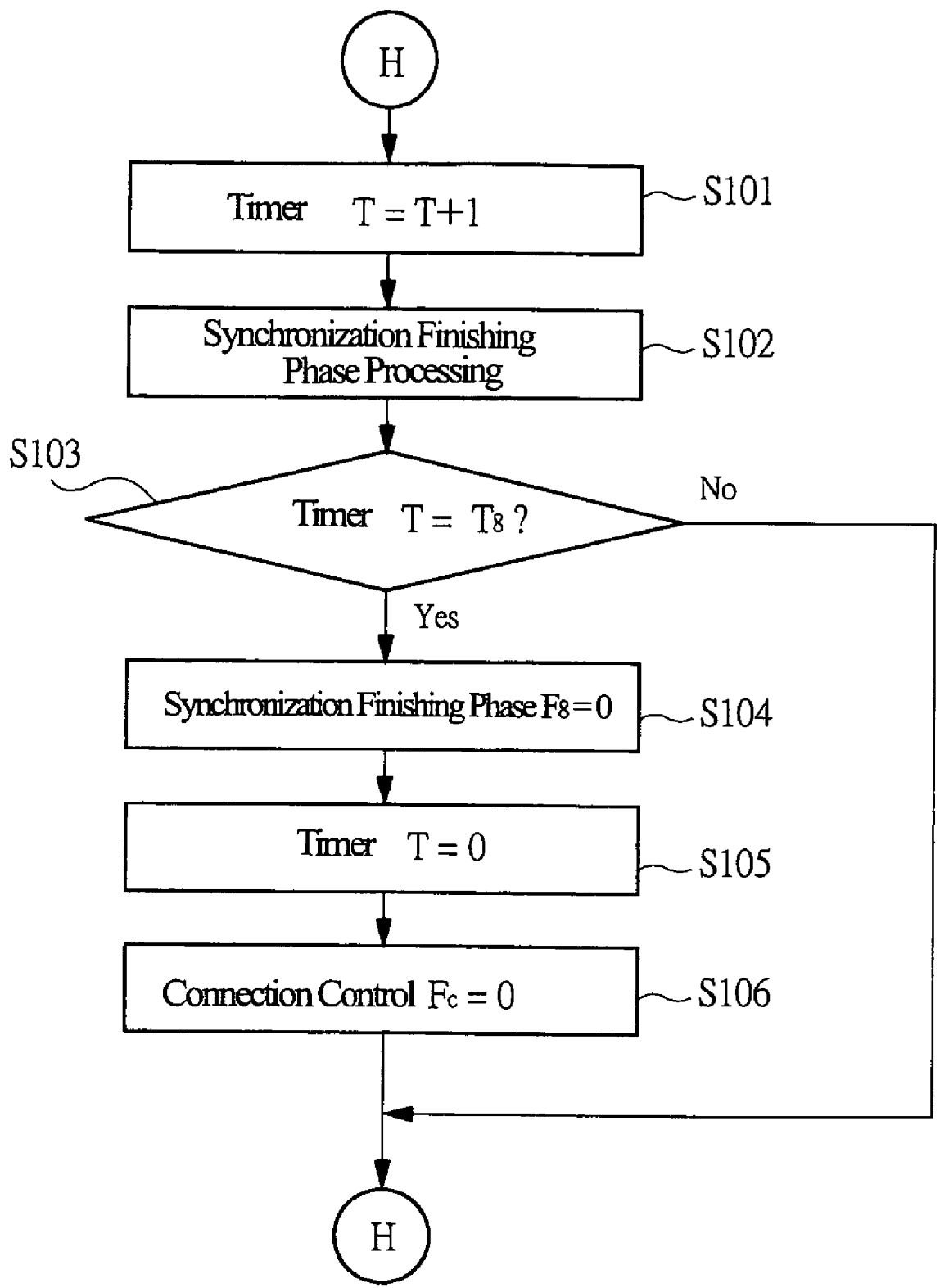
FIG. 18 is a flow chart showing a synchronization finishing phase.

If the synchronization finishing phase flag F8 is established in step S96 of FIG. 17, the revolution speed Nge of the power generating motor 21 is read and this value is set to the power generating revolution speed Ngr at a time of disconnecting the coupling 26 and the timer T is incremented in step S101 of FIG. 18, and a synchronization finishing phase processing in step S102 is executed. In this synchronization finishing phase processing, the target revolution speed Ngt of the power generating motor 21 is calculated in accordance with the following formula and is instructed to the power generating motor 21.

Target Revolution Speed $Ngt=(Ngr-Ngc) \times Ke+Ngc$.

Figure 6B:
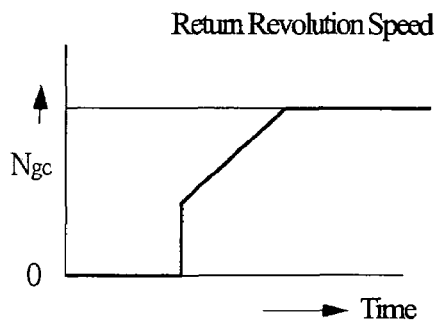
FIG. 6B is a characteristic diagram showing a return revolution speed.
Figure 6C:
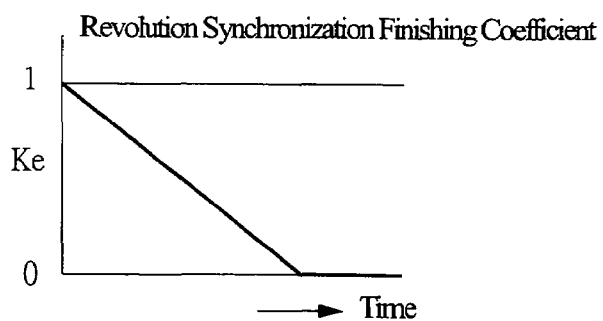
FIG. 6C is a characteristic diagram showing a revolution synchronization finishing coefficient.

In this formula, "Ngc" is a return revolution speed, and "Ke" is a revolution synchronization finishing coefficient. The return revolution speed Ngc is calculated as a function of the power generating revolution speed Ngr at a time of disconnecting the coupling, as shown in FIG. 6B, and the revolution synchronization finishing coefficient Ke is calculated as a function of time in accordance with a proceeding time of the synchronization finishing phase, as shown in FIG. 6C.

If it is determined in step S103 that the timer T becomes equal to a preset synchronization finishing phase time T8, a synchronization finishing phase flag F8 is set to failure and the timer T is reset and a connecting control flag Fc is established (steps S104 to S106).

The present invention is not limited to the above-mentioned embodiment and can be variously modified and altered without departing from the gist thereof. For example, the coupling 26 is not limited to illustrated types, and any coupling without being limited to the illustrated coupling can be employed as far as being shifted to a state of transmitting the rotation and a state of cutting off the transmission by an electromagnet.

The entire disclosure of a Japanese Patent Application No. 2003-361417, filed on Oct. 22, 2003 including specification, claims, drawings and summary, on which the Convention priority of the present application is based, is incorporated herein by reference in its entirety.

What is claimed is:

1. A control device for a hybrid vehicle, comprising:
    an engine driving drive wheels via an engine-power transmission path;
    a drive motor driving said drive wheels via a motor-power transmission path;
    a power generating motor provided to said engine-power transmission path and generating an electric power by said engine;
    a coupling having an input-side shaft and an output-side shaft and provided to said engine-power transmission path and switched between a connection state of transmitting a power of said engine to said drive wheels and a disconnection state of cutting off the transmission of the power of said engine to said drive wheels;
    a first revolution sensor for detecting a revolution speed of said power generating motor;
    a second revolution sensor for detecting a revolution speed of said drive motor; and
    a control unit,
    wherein, in the case where a power of said drive motor is transmitted to said drive wheels and said coupling is intended to switch from the disconnection state to the connection state,
    said control unit controls a revolution speed of said power generating motor based on a revolution speed of said drive motor,
    said control unit synchronizes said input-side shaft and said output-side shaft based on revolution speeds detected by said first and second revolution sensors,
    said control unit connects said coupling, and
    said control unit controls the power of said drive motor and the power of said engine in accordance with a required power of the vehicle after said coupling is connected.

2. The control device for a hybrid vehicle according to claim 1, further comprising: in connecting said coupling,
    a synchronization phase for synchronizing the revolution speed of said input-side shaft with the revolution speed of said output-side shaft;
    a synchronization determining phase for determining whether the synchronization is established;
    a connection phase for executing a connecting operation of said coupling; and
    a connection-side-power cooperation phase for changing the power of said engine and the power of said motor after the connection is completed,
    wherein each of said phases is transited in accordance with an elapsed time or the revolution speed of the power generating motor.

3. The control device for a hybrid vehicle according to claim 1, wherein, in connecting said coupling, a target revolution speed of said power generating motor is controlled by a function of time based on a revolution speed of said power generating motor at a time of starting the control.

4. The control device for a hybrid vehicle according to claim 1, wherein, in connecting said coupling, completion of the connection is determined when a state in which an error between the revolution speed and a target revolution speed of said power generating motor is within a predetermined range continues for a predetermined time.

5. The control device for a hybrid vehicle according to claim 1, wherein, after said coupling is connected, the power of said engine is increased and the power of said drive motor is decreased.

6. The control device for a hybrid vehicle according to claim 1, wherein said power generating motor is controlled in revolution speed until the connection of said coupling is completed, and said power generating motor is controlled in zero torque after the connection is completed.

7. The control device for a hybrid vehicle according to claim 1,
wherein, in the case where the power of said drive motor is transmitted to said drive wheels and said coupling is intended to switch from the disconnection state to the connection state,
said control unit controls the revolution speed of said power generating motor based on the revolution speed of said drive motor, so that the revolution speed detected by the first revolution sensor coincides with a revolution speed of said output-side shaft estimated based on the revolution speed detected by the second revolution sensor.

8. The control device for a hybrid vehicle according to claim 1, wherein said coupling is an electromagnetic coupling.

9. The control device for a hybrid vehicle according to claim 8, wherein said electromagnetic coupling has an electromagnetic coil, and is switched to said connection state in the case where a current flows in said electromagnetic coil.

10. A control device for a hybrid vehicle, comprising:
an engine driving drive wheels via an engine-power transmission path;
a drive motor driving said drive wheels via a motor-power transmission path;
a power generating motor provided to said engine-power transmission path and generating an electric power by said engine;
a coupling having an input-side shaft and an output-side shaft and provided to said engine-power transmission path and switched between a connection state of transmitting a power of said engine to said drive wheels and a disconnection state of cutting off the transmission of the power of said engine to said drive wheels;
a first revolution sensor for detecting a revolution speed of the power generating motor;
a second revolution sensor for detecting a revolution speed of the drive motor; and
a control unit,
wherein, in the case where the power of said engine is transmitted to said drive wheels and said coupling is intended to switch from the connection state to the disconnection state,
said control unit controls a power of said drive motor and the power of said engine in accordance with a required power of the vehicle,
said control unit disconnects said coupling, and said control unit controls a revolution speed of said power generating motor in accordance with a revolution speed of said drive motor based on revolution speeds detected by said first and second sensors after said coupling is disconnected, so that revolution speeds of said input-side shaft and said output-side shaft differ from each other.

11. The control device for a hybrid vehicle according to claim 10, wherein, in disconnecting said coupling, said power generating motor is controlled in zero torque until a disconnecting operation of said coupling is started, and said power generating motor is controlled in revolution speed after the disconnection is started.

12. The control device for a hybrid vehicle according to claim 10, further comprising: in disconnecting said coupling,
a disconnection-side-power cooperation phase for reducing the power of said engine;
a disconnection phase for disconnecting said coupling; and
a synchronization finishing phase for making said input-side shaft and said output-side shaft differ from each other in a revolution speed,
wherein, each of said phases is transited in accordance with an elapsed time or the revolution speed of said power generating motor.

13. The control device for a hybrid vehicle according to claim 10, wherein the revolution speed of said power generating motor after disconnecting said coupling is controlled by a target revolution speed of said power generating motor at a time of finishing the synchronization and a function of time.

14. The control device for a hybrid vehicle according to claim 10, wherein, in disconnecting said coupling, the power of said engine is decreased and the power of said drive motor is increased.

15. The control device for a hybrid vehicle according to claim 10, wherein said coupling is an electromagnetic coupling.

16. The control device for a hybrid vehicle according to claim 15, wherein said electromagnetic coupling has an electromagnetic coil, and is switched to said connection state in the case where a current flows in said electromagnetic coil.

17. A control device for a hybrid vehicle, comprising:
an engine driving drive wheels via an engine-power transmission path;
a drive motor driving said drive wheels via a motor-power transmission path;
a power generating motor provided to said engine-power transmission path and generating an electric power by said engine;
a coupling having an input-side shaft and an output-side shaft and provided to said engine-power transmission path and switched between a connection state of transmitting a power of said engine to said drive wheels and a disconnection state of cutting off the transmission of the power of said engine to said drive wheels;
a first revolution sensor for detecting a revolution speed of the power generating motor;
a second revolution sensor for detecting a revolution speed of the drive motor; and
a control unit for controlling said coupling,
wherein, in the case where a power of said drive motor is transmitted to said drive wheels and said coupling is intended to switch from the disconnection state to the connection state, said control unit sets a target revolution speed based on the revolution speed of the drive motor detected by said second revolution sensor, and said control unit determines a completion of synchronization of said input-side shaft and said output-side shaft of said coupling by judging if a difference between said target revolution speed and the revolution speed of said power generating motor detected by said first revolution sensor is within a predetermined range for a predetermined time.

18. The control device for a hybrid vehicle according to claim 17, wherein, in the case where the power of said drive motor is transmitted to said drive wheels and said coupling is intended to switch from the disconnection state to the connection state, said control unit controls the revolution speed of said power generating motor based on the revolution speed of said drive motor, so that the revolution speed of said power generating motor detected by the first revolution sensor coincides with a revolution speed of said output-side shaft estimated based on the revolution speed of said drive motor detected by the second revolution sensor.

19. The control device for a hybrid vehicle according to claim 17, wherein, in connecting said coupling, said target revolution speed of said power generating motor is controlled by a function of time based on a revolution speed of said power generating motor at a time of starting the control.

20. The control device for a hybrid vehicle according to claim 17, wherein, after said coupling is connected, the power of said engine is increased and the power of said drive motor is decreased.

21. The control device for a hybrid vehicle according to claim 17, wherein said power generating motor is controlled in revolution speed until the connection of said coupling is completed, and said power generating motor is controlled in zero torque control after the connection is completed.

22. The control device for a hybrid vehicle according to claim 17, wherein said coupling is an electromagnetic coupling.

23. The control device for a hybrid vehicle according to claim 17, further comprising: in connecting said coupling, a synchronization phase for synchronizing the revolution speed of said input-side shaft with the revolution speed of said output-side shaft;

a synchronization determining phase for determining whether the synchronization is established;

a connection phase for executing a connecting operation of said coupling; and a connection-side-power cooperation phase for changing the power of said engine and the power of said motor after the connection is completed, wherein each of said phases is transited in accordance with an elapsed time or the revolution speed of the power generating motor.

24. The control device for a hybrid vehicle according to claim 23, wherein said electromagnetic coupling has an electromagnetic coil, and is switched to said connection state in the case where a current flows in said electromagnetic coil.

* * * * *